US012683704B2

(12) United States Patent
Strobel et al.

(10) Patent No.: US 12,683,704 B2
(45) Date of Patent: Jul. 14, 2026

(54) HIGH-CAPACITY CHANNEL FOR HIGHER SPEED PASSIVE OPTICAL NETWORKS

(71) Applicant: MaxLinear, Inc., Carlsbad, CA (US)

(72) Inventors: Rainer Strobel, Munich (DE); Vladimir Oksman, Morganville, NJ (US)

(73) Assignee: MaxLinear, Inc., Carlsbad, CA (US)

( * ) Notice: Subject to any disclaimer, the term of this patent is extended or adjusted under 35 U.S.C. 154(b) by 283 days.

(21) Appl. No.: 18/314,705

(22) Filed: May 9, 2023

(65) Prior Publication Data

US 2023/0361904 A1 Nov. 9, 2023

Related U.S. Application Data

(60) Provisional application No. 63/364,412, filed on May 9, 2022.

(51) Int. Cl.
| | |
|---|---|
| *H04J 14/02* | (2006.01) |
| *H04B 10/25* | (2013.01) |
| *H04B 10/43* | (2013.01) |
| *H04B 10/50* | (2013.01) |
| *H04Q 11/00* | (2006.01) |
| *H04B 10/272* | (2013.01) |

(52) U.S. Cl.
CPC ...... *H04J 14/0221* (2013.01); *H04J 14/0245* (2013.01); *H04Q 11/0067* (2013.01); *H04B 10/25* (2013.01); *H04B 10/272* (2013.01); *H04B 10/43* (2013.01); *H04B 10/50* (2013.01)

(58) Field of Classification Search
None
See application file for complete search history.

(56) References Cited

U.S. PATENT DOCUMENTS

| | | |
|---|---|---|
| 2002/0105965 A1 | 8/2002 | Dravida et al. |
| 2013/0202300 A1 | 8/2013 | Dvir et al. |
| 2014/0321863 A1* | 10/2014 | Diab .................. H04B 10/272 398/189 |
| 2015/0049843 A1 | 2/2015 | Reuven et al. |

(Continued)

OTHER PUBLICATIONS

International Search Report and Written Opinion in PCT/US2023/021569 mailed Aug. 1, 2023.

*Primary Examiner* — Darren E Wolf
(74) *Attorney, Agent, or Firm* — Jason W. Croft; Buchalter

(57) ABSTRACT

According to an aspect of an embodiment, an optical line terminal (OLT) configured for downstream transmission in a passive optical network (PON) may comprise a processing device and a transceiver. The processing device may be configured to: generate a first downstream signal for transmission on a first channel at a first signal level, and generate a second downstream signal for transmission on a second channel at a second signal level. The first signal level may be greater than the second signal level. The PMD transmitter may be configured to transmit a combined downstream signal comprising the first downstream signal and the second downstream signal. The first transmit power of the first downstream signal may be selected based on a comparison to a second transmit power of the second downstream signal to facilitate reception of the first downstream signal from the combined downstream signal at an optical network unit (ONU).

16 Claims, 27 Drawing Sheets

(56) References Cited

U.S. PATENT DOCUMENTS

| | | | |
|---|---|---|---|
| 2015/0249314 A1* | 9/2015 | Onaka | H04B 10/298 |
| | | | 359/342 |
| 2017/0111118 A1 | 4/2017 | Franck et al. | |
| 2018/0309534 A1* | 10/2018 | Wey | H04B 10/07955 |
| 2018/0337816 A1 | 11/2018 | Herath et al. | |
| 2019/0140741 A1* | 5/2019 | Cheng | H04B 10/25753 |
| 2020/0296487 A1 | 9/2020 | Bonk et al. | |
| 2020/0336203 A1 | 10/2020 | Hassan | |

\* cited by examiner

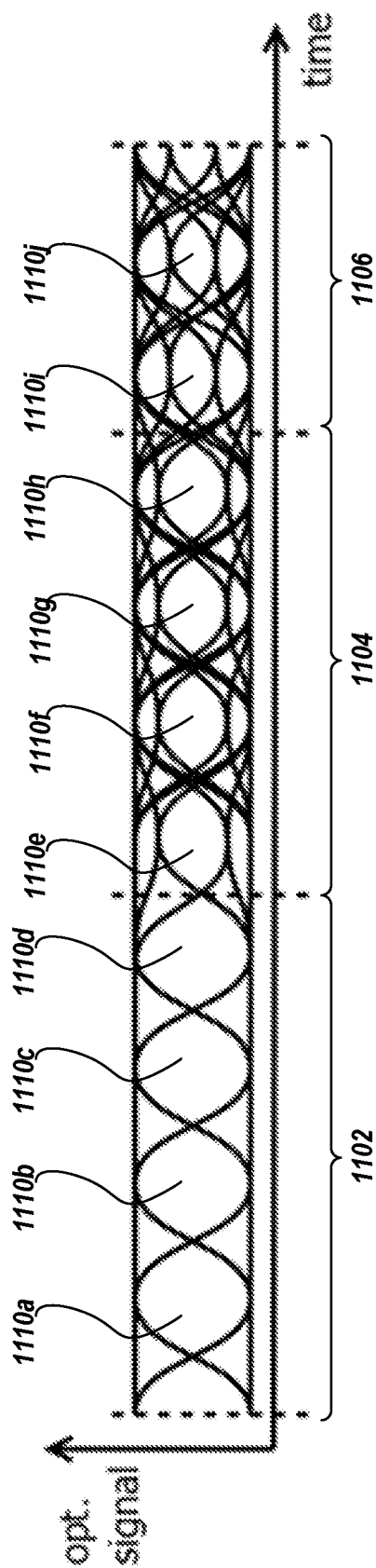
FIG. 11

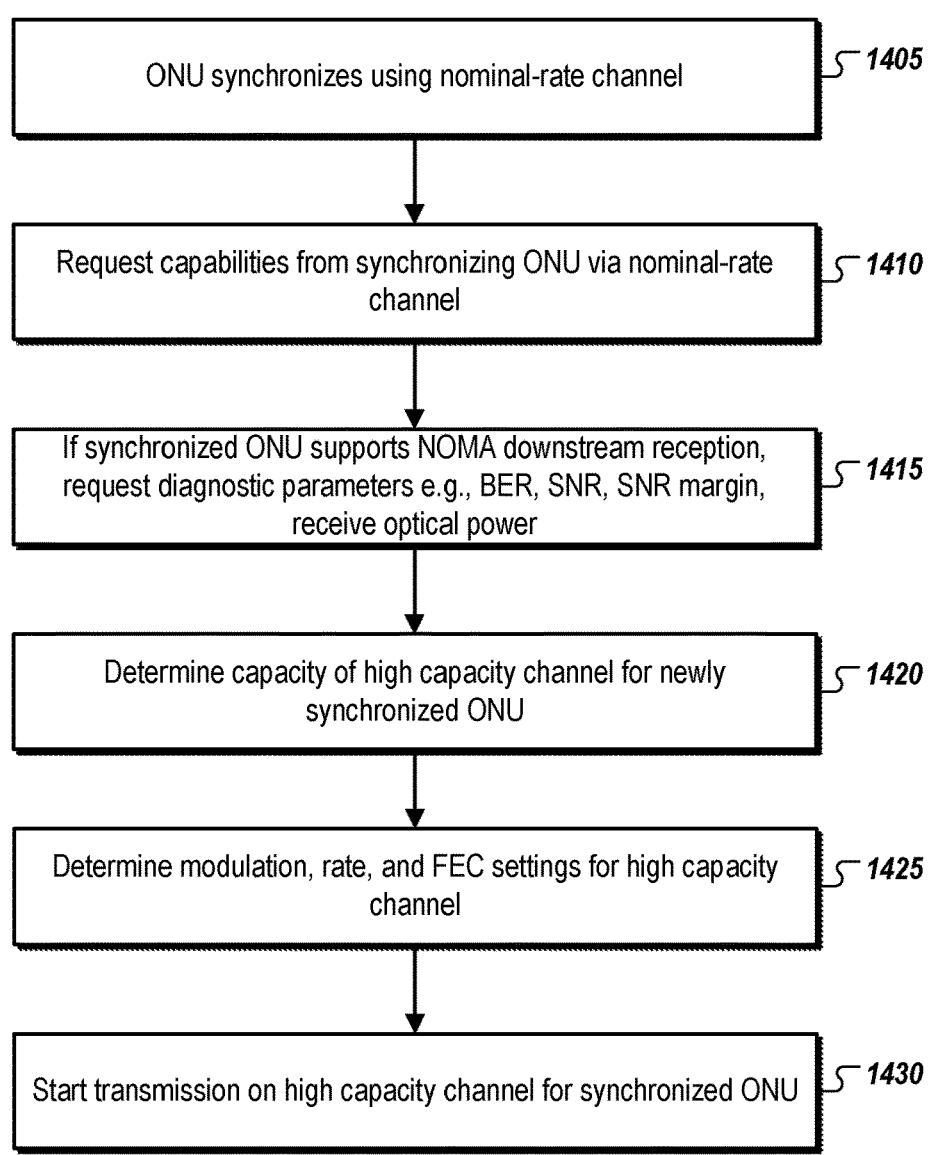

ONU synchronizes using nominal-rate channel　　1405

Request capabilities from synchronizing ONU via nominal-rate channel　　1410

If synchronized ONU supports NOMA downstream reception, request diagnostic parameters e.g., BER, SNR, SNR margin, receive optical power　　1415

Determine capacity of high capacity channel for newly synchronized ONU　　1420

Determine modulation, rate, and FEC settings for high capacity channel　　1425

Start transmission on high capacity channel for synchronized ONU　　1430

FIG. 14

1500 generate a first downstream signal for transmission on a first channel at a first signal level ⟋ 1505 generate a second downstream signal for transmission on a second channel at a second signal level, wherein the first signal level is greater than the second signal level ⟋ 1510

1600

1700 decode, at the ONU, the first downstream signal          ⌐ 1705 decode, at the ONU, the second downstream signal by canceling the first downstream signal from the combined downstream signal          ⌐ 1710

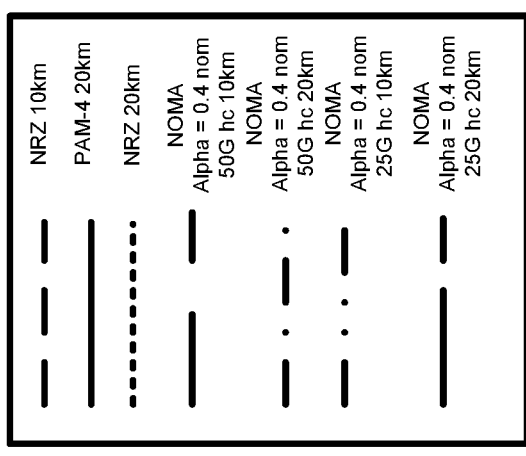
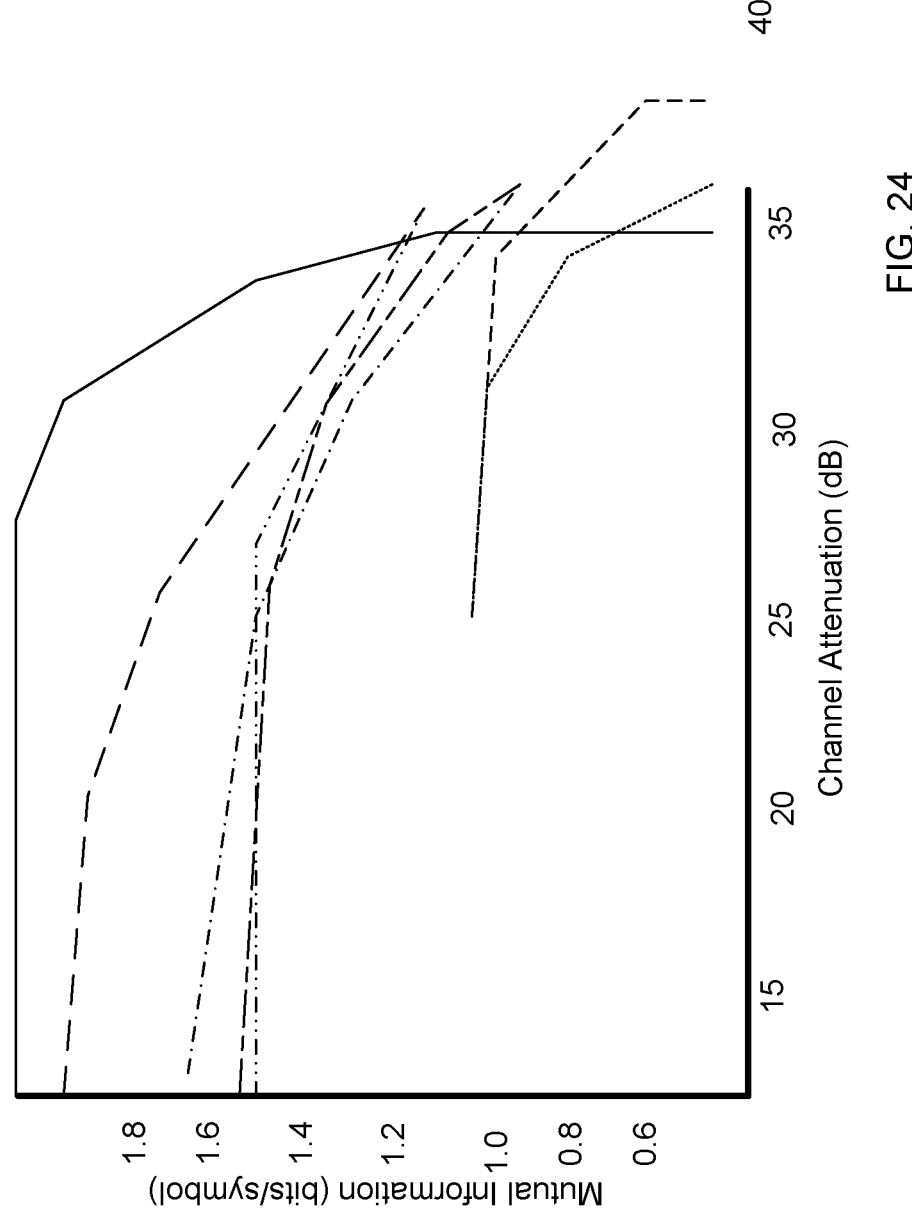
FIG. 24

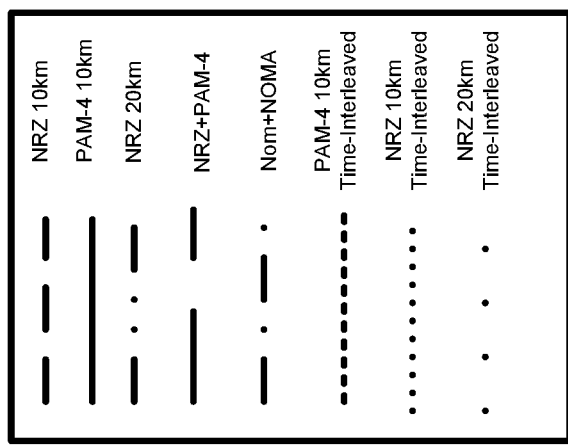
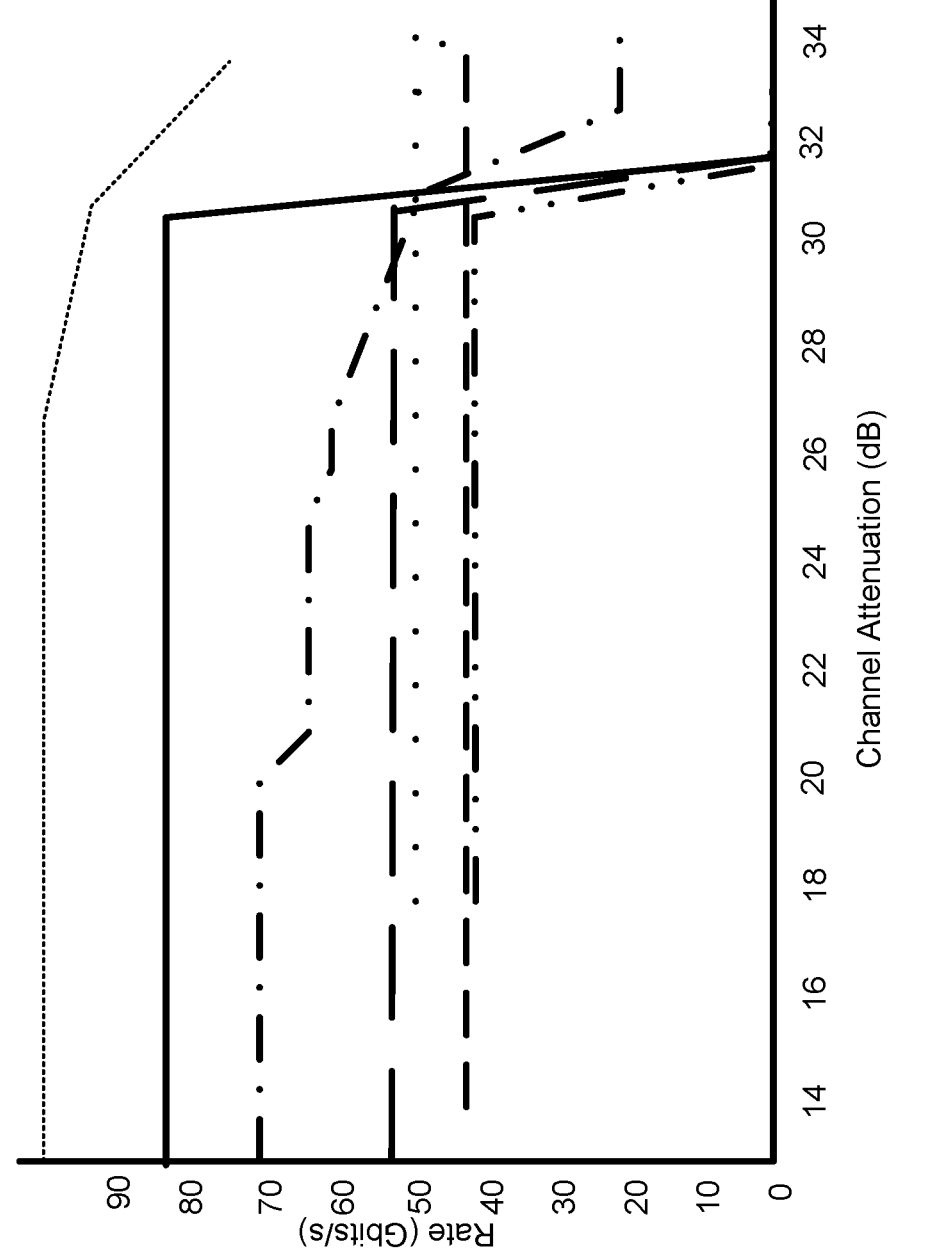
FIG. 25

HIGH-CAPACITY CHANNEL FOR HIGHER SPEED PASSIVE OPTICAL NETWORKS

RELATED APPLICATION

This application claims the benefit of U.S. Provisional Application No. 63/364,412, filed May 9, 2022, the disclosure of which is incorporated herein by reference in its entirety.

The embodiments discussed in the present disclosure are related to passive optical networks, and, in some embodiments, high-capacity channel for higher speed passive optical networks.

BACKGROUND

Unless otherwise indicated herein, the materials described herein are not prior art to the claims in the present application and are not admitted to be prior art by inclusion in this section.

Passive optical networks (PONs) may include an optical line terminal (OLT) that may be connected to one or more optical network units (ONUs). Transmissions from the OLT to the one or more ONUs may include a broadcast that may be received by all ONUs included in the PON.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, an optical line terminal (OLT) for downstream transmission in a passive optical network (PON) may comprise a processing device and a physical medium dependent (PMD) transmitter. The processing device may be configured to generate a first downstream signal for transmission on a first channel at a first signal level. The processing device may be configured to generate a second downstream signal for transmission on a second channel at a second signal level. The first signal level may be greater than the second signal level. The PMD transmitter may be configured to transmit a combined downstream signal comprising the first downstream signal and the second downstream signal. The first transmit power of the first downstream signal may be selected based on a comparison to a second transmit power of the second downstream signal to facilitate reception of the first downstream signal from the combined downstream signal at an optical network unit (ONU).

In some embodiments, an OLT for upstream reception in a PON may comprise a PMD receiver and a processing device. The PMD receiver may be configured to receive, at the OLT, a combined upstream signal comprising a first upstream signal and a second upstream signal. The first upstream signal may be received from a first ONU and the second upstream signal may be received from a second ONU. The first upstream signal may have a greater receive power than the second upstream signal. The processing device may be configured to decode, at the OLT, the first upstream signal, and decode, at the OLT, the second upstream signal by canceling the first upstream signal from the combined upstream signal.

In some embodiments, an ONU for downstream receiving in a PON may comprise a PMD receiver and a processing device. The PMD receiver may be configured to receive, at the ONU from an OLT, a combined downstream signal comprising a first downstream signal and a second downstream signal. The first downstream signal may have a greater receive power than the second downstream signal. The processing device may be configured to decode, at the ONU, the first downstream signal, and decode, at the ONU, the second downstream signal by canceling the first downstream signal from the combined downstream signal.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 11 illustrates a passive optical network transmission with different settings for the high-capacity channel.

FIG. 14 illustrates operations for establishing a high-capacity channel when an ONU synchronizes to the OLT.

FIG. 24 illustrates mutual information vs. channel attenuation for NOMA transmission.

FIG. 25 illustrates attenuation vs. data rate for NOMA transmission vs. time-interleaved PAM-4 and NRZ transmission.

DESCRIPTION OF EMBODIMENTS

Figure 1:
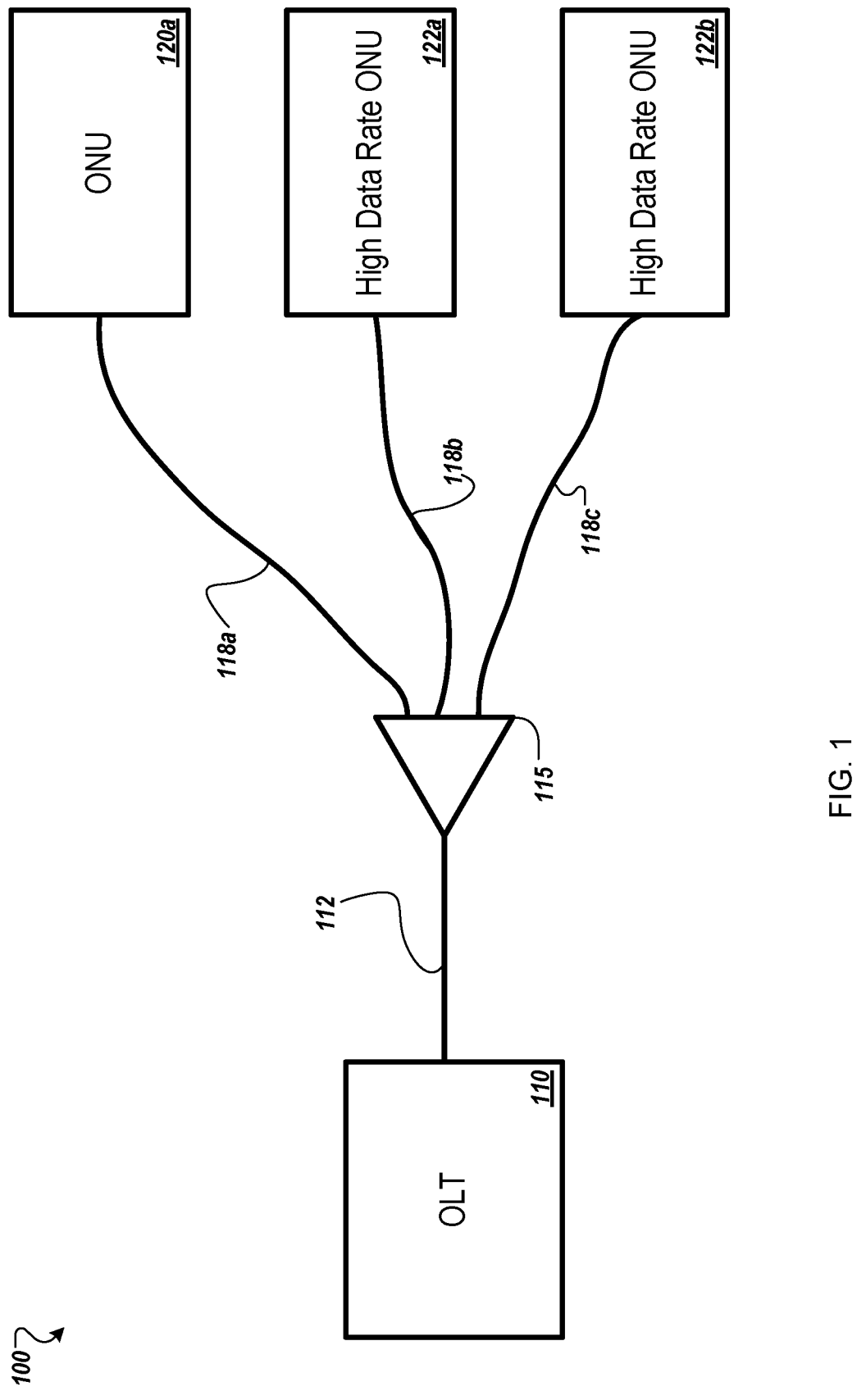
FIG. 1 illustrates an example passive optical network.

An example passive optical network (PON) may include a point-to-multipoint network. An optical line termination (OLT) may be connected to multiple optical network units (ONUs) through fibers and passive optical splitters. There may be a mix of different generations of ONUs connected to the same OLT, e.g., some legacy ONUs and some enhanced ONUs supporting additional features.

With increasing transmission speed, determining a maximum transmission speed in a PON with respect to the weakest link is no longer appropriate. A transmission scheme allowing different transmission rates for different ONUs according to the channel quality, e.g., by different forward error correction (FEC) and/or modulation settings, may be more efficient. ONUs with high channel quality may be served with a higher data rate with a reduced latency. All ONUs may benefit from this increase in data rate and reduction in latency because additional transmission time may be used for ONUs having a lower channel quality and being served at a lower data rate.

In the upstream, transmit time slots may be allocated for each ONU according to the traffic requirements. Each ONU may transmit its burst with different modulation and FEC settings. In the downstream, data may be transmitted as a broadcast and all connected ONUs may receive the same data stream. Thus, different modulation and FEC settings may not be assigned for different ONUs because multiple ONUs may receive the transmitted symbols. Thus, determining when different ONUs may receive different modulation or FEC settings in the downstream direction may facilitate a difference in transmission parameters (e.g., modulation settings, FEC settings).

One possible scheme for adaptive transmission settings in the downstream may involve using groups of ONUs having the same transmission parameters (e.g., modulation and FEC settings), which may be served at the same time together. In the downstream broadcast direction, different ONU groups may have dedicated transmit times in the so that ONUs with a low channel quality that receive the nominal data rate may not receive higher data rate signals having different modulation and FEC settings. However, this transmission scheme may not be compatible with other PON transmission schemes that use fixed modulation settings (non-return-to-zero (NRZ) modulation with 2 optical power levels) and one fixed FEC code in the downstream.

In some embodiments, non-orthogonal multiple access (NOMA) may be used to provide a second channel (e.g., a high-capacity channel) on top of a nominal-rate channel in a 50G passive optical network. A nominal-rate channel may use: (i) the nominal modulation, (ii) the nominal FEC settings, and (iii) the legacy frame structure. The nominal-rate channel may be broadcast to a plurality of ONUs. The high-capacity channel may be added to that nominal-rate channel. The transmit power and FEC settings of the high-capacity channel may be adjusted to be received by ONUs having a higher channel quality. The high-capacity channel may be configured (i.e., use a different transmit power and FEC settings) based on the receiving ONU group. In some examples, transmission of the high-capacity channel may be disabled.

In some embodiments, an ONU that does not support a high-capacity channel may decode the nominal-rate channel by identifying the high-capacity channel as noise. For an ONU that supports the high-capacity channel, the ONU may receive the nominal-rate channel and the high-capacity channel. The nominal-rate channel may be decoded and subtracted from the combined channel to obtain the high-capacity channel. The overall capacity of the PON may increase because of the presence of an additional channel. Therefore, adaptive modulation and adaptive FEC settings may facilitate an increase in the capacity of the network while maintaining compatibility for ONUs that use fixed modulation or fixed FEC settings.

In some embodiments, an optical line terminal (OLT) for downstream transmission in a passive optical network (PON) may comprise a processing device and a physical medium dependent (PMD) transmitter. The processing device may be configured to generate: (i) a first downstream signal for transmission on a first channel at a first signal level, and (ii) a second downstream signal for transmission on a second channel at a second signal level. The first signal level may be greater than the second signal level. The PMD transmitter may be configured to transmit a combined downstream signal comprising the first downstream signal and the second downstream signal. The first transmit power of the first downstream signal may be selected based on a comparison to a second transmit power of the second downstream signal to facilitate reception of the first downstream signal from the combined downstream signal at an optical network unit (ONU).

In some embodiments, an ONU for downstream receiving in a PON may comprise a PMD receiver and a processing device. The PMD receiver may be configured to receive, from an OLT, a combined downstream signal comprising a first downstream signal and a second downstream signal. The first downstream signal may have a greater receive power than the second downstream signal. The processing device may be configured to decode the first downstream signal, and decode the second downstream signal by canceling the first downstream signal from the combined downstream signal.

In some embodiments, an OLT for upstream reception in a PON may comprise a PMD receiver and a processing device. The PMD receiver may be configured to receive a combined upstream signal comprising a first upstream signal and a second upstream signal. The first upstream signal may be received from a first ONU and the second upstream signal may be received from a second ONU. The first upstream signal may have a greater receive power than the second upstream signal. The processing device may be configured to decode the first upstream signal and the second upstream signal. The second upstream signal may be decoded by canceling the first upstream signal from the combined upstream signal.

Embodiments of the present disclosure will be explained with reference to the accompanying drawings.

In some embodiments, FIG. 1 illustrates a passive optical network (PON) comprising an optical line terminal (OLT) 110 comprising optical network units (ONUs) 122*a*, 122*b* connected to a high quality channel that may have higher data rates (High Data Rate ONU 122*a*, 122*b*), and ONUs 120*a* using a nominal (lower) data rate. A transmission scheme which allows different transmission bit rates for different ONUs may be used in both upstream and downstream directions. The present disclosure describes a transmission method which allows increased data rate for ONUs (e.g., 122*a*, 122*b*) with high channel quality. The high-data rate ONUs 122*a*, 122*b* may be fully backward compatible with an ONU 120*a* connected to the OLT 110 that use a nominal data rate.

Figure 2:
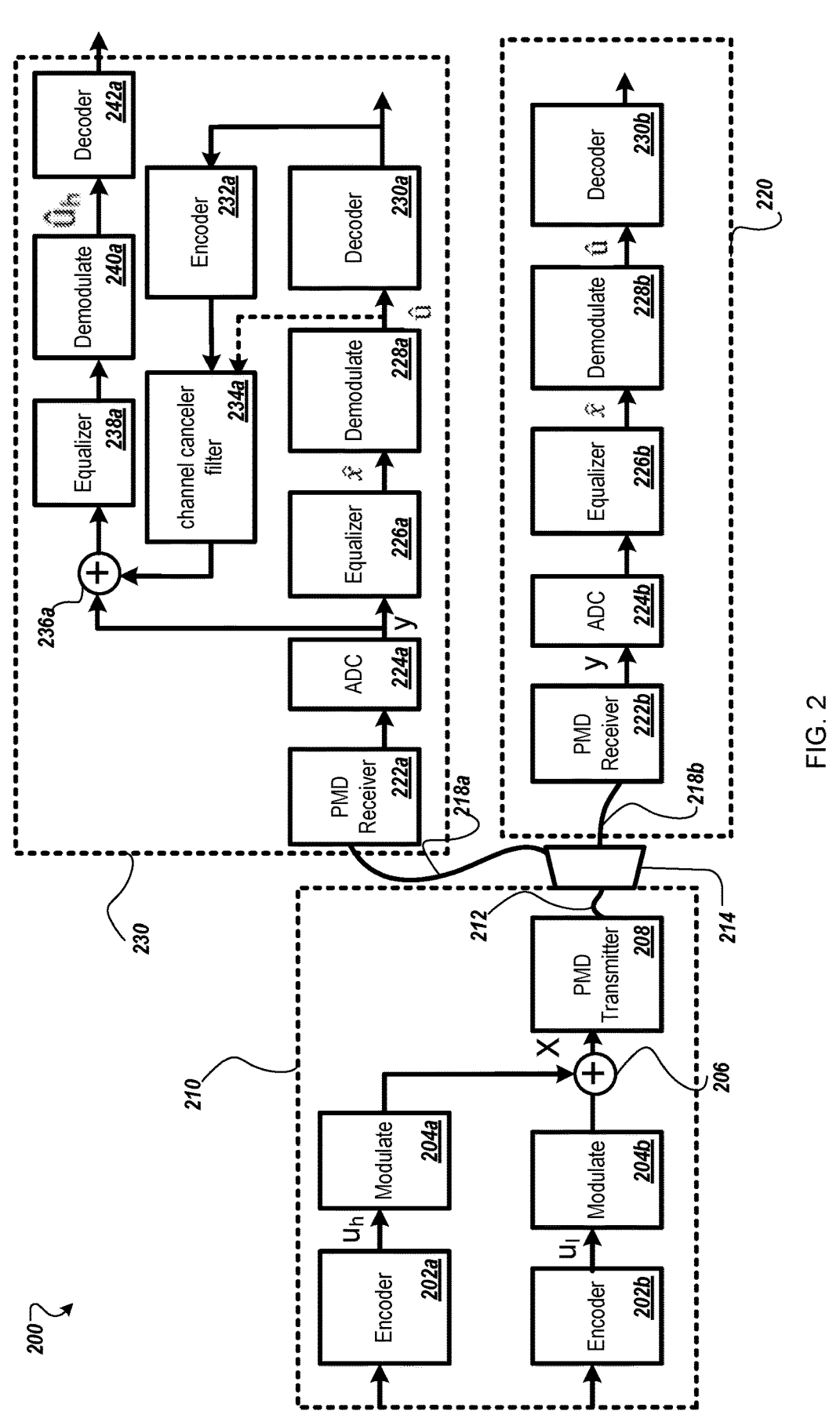
FIG. 2 illustrates an example passive optical network transmission model for a downstream direction.

In some embodiments, as illustrated in FIG. 2, an example PON transmission model for NOMA in the downstream direction may comprise an OLT 210 that provides two data channels: (i) the first channel (e.g., nominal data rate channel) with the bit sequence $u_l$, and (ii) the second channel (e.g., high-capacity channel) with the transmit bit sequence $u_h$; therefore, the high-capacity channel may have a greater data capacity than the nominal data rate channel. The PON 200 may comprise an OLT 210 for downstream transmission. The OLT 210 may comprise a processing device configured to: generate a first downstream signal (e.g., $u_l$) for transmission on a first channel at a first signal level, and generate a second downstream signal (e.g., $u_h$) for transmission on a second channel at a second signal level, wherein the first signal level is greater than the second signal level.

In some embodiments, the OLT 210 may comprise an encoder 202*a* configured to encode the second downstream signal (e.g., using forward error correction (FEC) encoding) to output the second downstream signal (e.g., $u_h$) for transmission on the second channel. The second downstream signal (e.g., $u_h$) may be directed to the modulate block 204*a* to be modulated and received by the combiner 206.

In some embodiments, the OLT 210 may comprise an encoder 202*b* configured to encode the second downstream signal (e.g., using FEC encoding) to output the first downstream signal (e.g., $u_l$) for transmission on the first channel. The first downstream signal (e.g., $u_l$) may be output to the modulate block 204*b* to be modulated and received by the combiner 206.

In some embodiments the first downstream signal (e.g., $u_l$, which may be modulated) and the second downstream signal (e.g., $u_h$, which may be modulated) may be combined at the combiner 206. The combined downstream signal, X, may be directed to the physical medium dependent (PMD) transmitter 208. The PMD transmitter 208 may be configured to transmit a combined downstream signal, X, comprising the first downstream signal (e.g., $u_l$) and the second downstream signal (e.g., $u_h$), using a fiber optic connection 212.

In some embodiments, the second downstream channel (e.g., a high-capacity channel) may use a different (e.g., lower) signal level than the first downstream channel (e.g., nominal data-rate channel). While the first downstream channel signal level and transmit power may have a level of variation that is relatively low, the second downstream channel (e.g., high-capacity channel) signal level and transmit power may have a level of variability that is higher, compared to the variability of the transmit power of the first downstream channel, depending on the channel quality of the receiving ONUS. In one example, as the channel quality for a particular ONU increases, the transmit power for the channel may be lowered.

In some embodiments, a first transmit power of the first downstream signal (e.g., $u_l$) may be selected based on a comparison to a second transmit power of the second downstream signal (e.g., $u_h$) to facilitate reception of the first downstream signal (e.g., $u_l$) from the combined downstream signal, X, at an optical network unit (ONU) 220, 230. In one example, the combined downstream signal, X, may be used to receive the first downstream signal (e.g., $u_l$) at one or more of an ONU 220 configured to operate using a nominal (lower) data rate, or a high-data rate ONU 230 configured to operate using a high-data rate.

In some embodiments, a processing device may be configured to compute a transmit power scale factor for the second downstream signal, wherein the transmit power scale factor is selected to facilitate reception of the first downstream signal from the combined downstream signal.

In some embodiments, for time instance t, the combined signal x may be computed using:

$$x_t = \mathrm{mod}(u_{l,t}) + \alpha_h \mathrm{mod}(u_{h,t})$$

wherein $u_{l,t}$ is the first downstream signal at time instance t and $u_{h,t}$ is the second downstream signal at time instance t with a scale factor $\alpha_h < 1$ for the high-capacity channel.

In some embodiments, the first downstream signal, $u_l$, when combined with the second downstream signal, $u_h$, may result in an increase in distortion compared to a scenario in which the first downstream signal, $u_l$, is transmitted in the absence of the second downstream signal, $u_h$. Thus, when the first downstream signal, $u_l$, is combined with the second downstream signal, $u_h$, the transmit power of the first downstream signal, $u_l$, may be adjusted to compensate for the increase in distortion in the combined downstream signal. In one example, the transmit power of the first downstream signal, $u_l$, may be increased, relative to a scenario in which the first downstream signal, $u_l$, is transmitted in the absence of the second downstream signal, $u_h$, to compensate for the increase in distortion in the combined downstream signal.

In some embodiments, the transmit power of the first downstream signal, $u_l$, or the second downstream signal, $u_h$, may be reduced based on distortion arising from an excessive transmit power. Alternatively, or in addition, the transmit power of the first downstream signal, $u_l$, or the second downstream signal, $u_h$, may be computed based on an industry standard (e.g., Telecommunication Standardization Sector of the International Telecommunication Union (ITU)). Alternatively, or in addition, the transmit power of the first downstream signal, $u_l$, or the second downstream signal, tin, may be computed based to reduce power consumption or energy consumption.

In some embodiments, the combined electrical signal (e.g., the combined downstream signal) may be converted to an optical signal and transmitted over fibers 212 and splitters 214 to the ONUs 220 and 230. In some embodiments, the first downstream signal and the second downstream signal may be converted from electrical to optical as separate signals and combined in the optical domain to generate the combined downstream signal. Therefore, the combined downstream signal may be an electrical signal or an optical signal. When combined in the electrical domain, the combined downstream signal may be generated using digital conversion.

In some embodiments, an ONU 220 for downstream receiving in a PON 200 may comprise a fiber 218*b* configured to provide a first downstream signal to a PMD receiver 222*b*. The PMD receiver may be configured to convert the first downstream signal from an optical signal to an electrical signal, y. The received electrical signal, y, may be converted to a digital signal using the analog-to-digital converter (ADC) 224*b*. The digital signal may be directed to the equalizer 226*b*, which may be configured to mitigate inter-symbol interference, and recovered as the signal, x̂. With a linear equalizer using $N_{eqmain}$ taps $g_{eqmain,1}, \ldots, g_{eqmain,N_{eqmain}}$, the signal, x̂ may be computed at time instance, t, using:

$$\hat{x}_t = \sum_{i=1}^{N_{eqmain}} y_{t-i} g_{eqmain,i}$$

In some embodiments, the signal, x̂, may be demodulated in block 228*b* to generate signal, û, which may be decoded using a decoder 230*b* (e.g., an FEC decoder) to generate an output signal.

In some embodiments, the receiver of the ONU 220 may accept the second downstream signal (e.g., of the high-capacity channel) that is present on the combined downstream signal as additional noise. When the transmit power of the first channel is selected accordingly, the presence of the second channel (e.g., the high-capacity channel) may not impact the reception of the first channel (e.g., the nominal data-rate channel).

In some embodiments, an ONU 230 for downstream receiving in a PON 200 may comprise a PMD receiver 222*a* configured to receive, at the ONU 230 from an OLT 210, a combined downstream signal comprising a first downstream signal and a second downstream signal. In some examples, the first downstream signal may have a greater receive power than the second downstream signal. In some embodiments, the ONU 230 may comprise a processing device configured to: decode the first downstream signal, and decode the second downstream signal by canceling the first downstream signal from the combined downstream signal.

In some embodiments, in an ONU (e.g., 230) supporting the high-capacity channel, after the receive signal is converted into an electrical signal, digitized, and equalized, then demodulation and decoding may be performed in two parallel channels (e.g., a nominal-rate channel and a high-data channel). For the first downstream signal (e.g., the nominal-rate channel), the operations may be as described with respect to 220. For the second downstream signal (e.g., the high-capacity channel), the operations may use a different signal path compared to the first downstream signal (e.g., the nominal-rate channel).

In some embodiments, the PMD receiver 222*a* may be configured to convert the combined downstream signal, received at the PMD receiver as an optical signal (via the fiber 218*a*) to an electrical signal. The electrical signal may be converted to a digital signal, y, using the ADC 224*a*. The digital signal, y, may be directed to an equalizer 226*a*, which may be configured to mitigate inter-symbol interference and output the recovered signal, x̂. The recovered signal x̂, may be directed to the demodulate block 228*a* to be demodulated and directed to the decoding block 230*a* to decode the first downstream signal using the combined downstream signal present in the recovered signal, x̂.

In some embodiments, the output from the decoder 230*a* (e.g., the decoded bit sequence computed based on the first downstream signal) may be directed to the encoder 232*a* to be re-encoded and provided to a channel canceler filter 234*a* (e.g., a nominal-rate channel canceler filter). The channel canceler filter 234*a* may be configured to filter and subtract from the ADC 224*a* output signal to obtain the high-capacity channel which may be computed using:

$$\hat{u}_{l,t} = \text{demod}(\hat{x}_t)$$

where $\hat{u}_{l,t}$ is the cancellation signal at time instance t and $\hat{x}_t$ is the equalizer 226*a* output at time instance t.

In some embodiments, this signal path (i.e., from the decoder 230*a*, to the encoder 232*a*, to the channel canceler filter 234*a*) may be denoted as the "high-rate path". This high-rate path minimizes error propagation from the "nominal-rate path" (i.e., from the equalizer 226*a*, to the demodulate block 228*a*, to the decoder 230*a*) into the high-rate path.

In another embodiment, denoted as a "low-latency path," a hard decision may be performed on the demodulate block 228*a* output of the first downstream channel to generate an input for the channel canceler filter 234*a* using:

$$\hat{u}_{l,t} = \text{encode}(\text{decode}(\text{demod}(\hat{x}_t)))$$

where $\hat{u}_{l,t}$ is the cancellation signal at time instance t and $\hat{x}_t$ is the equalizer 226*a* output at time instance t. For this low-latency path, the $\hat{x}_t$ may not be previously decoded and encoded because the low-latency path may omit the decoder 230*a* and the encoder 232*a* when being input to the channel canceler filter 234*a*.

In some embodiments, the output from the channel canceler filter 234*a* may be used to cancel the first downstream signal from the combined downstream signal received at the combiner. The first downstream signal may be canceled from the combined downstream signal by using one or more of: (i) a slicer output; or (ii) a re-encoded decoder output. In some examples, reconstructing the first downstream channel may result in decoding the high-capacity channel so that errors do not accumulate.

In some embodiments, the hard decision output signal may be filtered and subtracted from the ADC output signal at the combiner 236*a*. With a channel canceler filter 234*a* (e.g., a linear channel canceler filter) with $N_{mcc}$ taps $g_{mcc,1}, \ldots, g_{mcc,N_{mcc}}$, the signal after subtraction may be:

$$\hat{y}_{h,t} = y_t - \sum_{i=1}^{N_{mcc}} \text{mod}\,(\hat{u}_{l,t-i}) g_{mcc,i}$$

In some embodiments, after the first downstream signal has been canceled from the combined downstream signal using channel cancellation, the second downstream signal (e.g., carried on the high-capacity channel) may be recovered using a second equalizer 238*a*. With a linear equalizer using $N_{eqhigh}$ taps a $e_{qhigh,1}, \ldots, g_{eqhigh,N_{eqhigh}}$ the recovered second downstream signal may be computed using:

$$\hat{x}_{h,t} = \sum_{i=1}^{N_{eqhigh}} \hat{y}_{h,t-i} g_{eqhigh,i}$$

In some embodiments, the equalizer 238*a* output may be demodulated using demodulate block 240*a* to generate the signal, in which may be decoded using decoder 242*a*. The recovered two data streams, $u_l$ and $u_h$, may be forwarded for further processing, e.g., to the customer network.

In some embodiments, the channel canceler filter 234*a* may be configured to generate a cancellation signal to cancel the first downstream signal from the combined downstream signal based on one or more of an analog-to-digital (ADC) (e.g., 224*a*) output signal or an equalizer output signal (e.g., 226*a*).

Figure 3A:
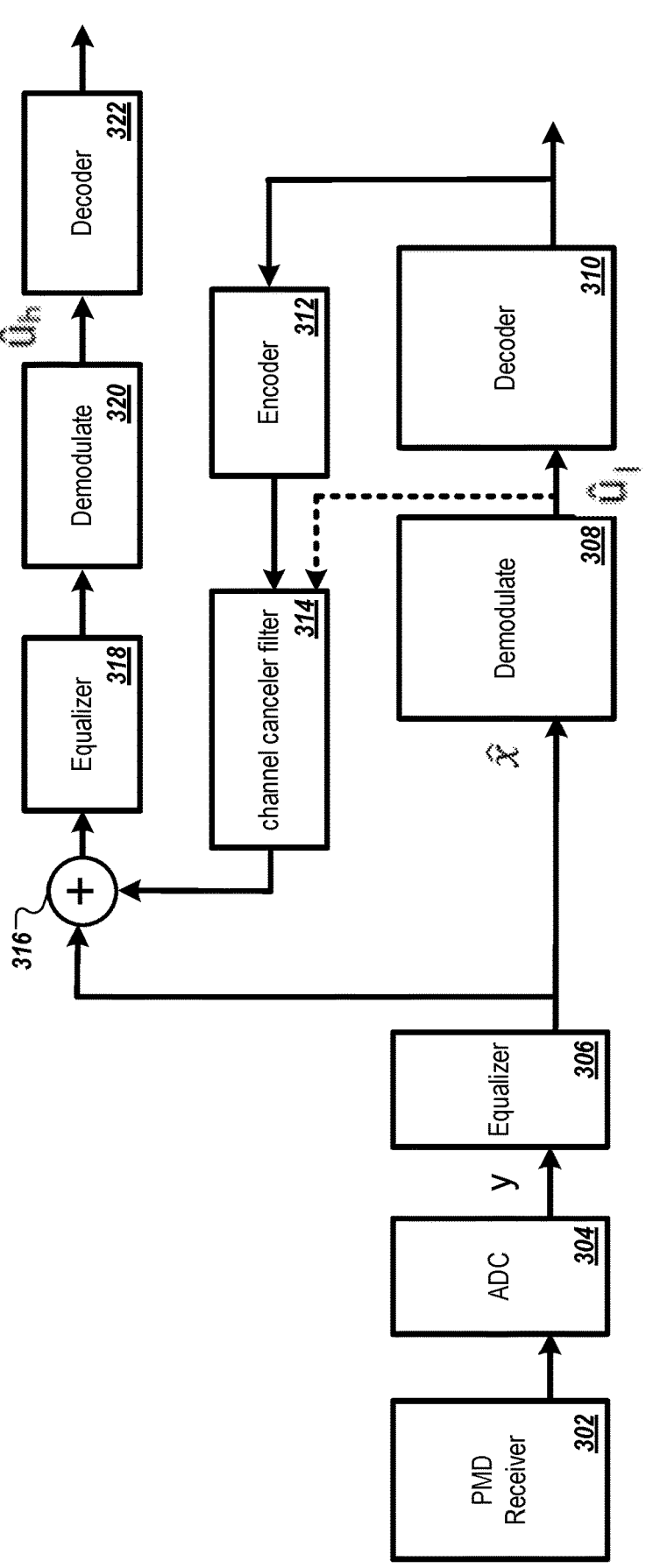
FIG. 3A illustrates an example non-orthogonal multiple access (NOMA) receiver structure.

In some embodiments, as illustrated in FIG. 3A, a receiver 300 (e.g., for an ONU) may be configured to generate a cancellation signal to subtract a first downstream signal from a combined downstream signal. The signal for cancellation of the second downstream signal may be taken from the input to the equalizer (as illustrated in FIG. 2) or from the output from the equalizer (as illustrated in FIGS. 3A and 3B).

In some embodiments, when one equalizer is used for the first downstream signal and the second downstream signal, the noise may not be mitigated when compared to a scenario in a different equalizer is used for the second downstream signal. Using different equalizers may provide reduced noise because each equalizer may be designed to reduce the noise for the specific downstream signal.

In some embodiments, the first downstream signal may be decoded using a first equalizer 306 and the second downstream signal may be decoded using a second equalizer 318. In some embodiments, when the cancellation signal is taken from the output from the equalizer 306, the high-capacity channel may use a second equalizer 318 which may be coupled to the equalizer 306 output and the summing point. The second equalizer may be optimized for the characteristics of the high-capacity channel. In one example, the second equalizer may be omitted as illustrated in FIG. 3B. In some embodiments, the receivers in FIG. 3A or FIG. 3B may comprise a nonlinear filter (not shown).

Figure 3B:
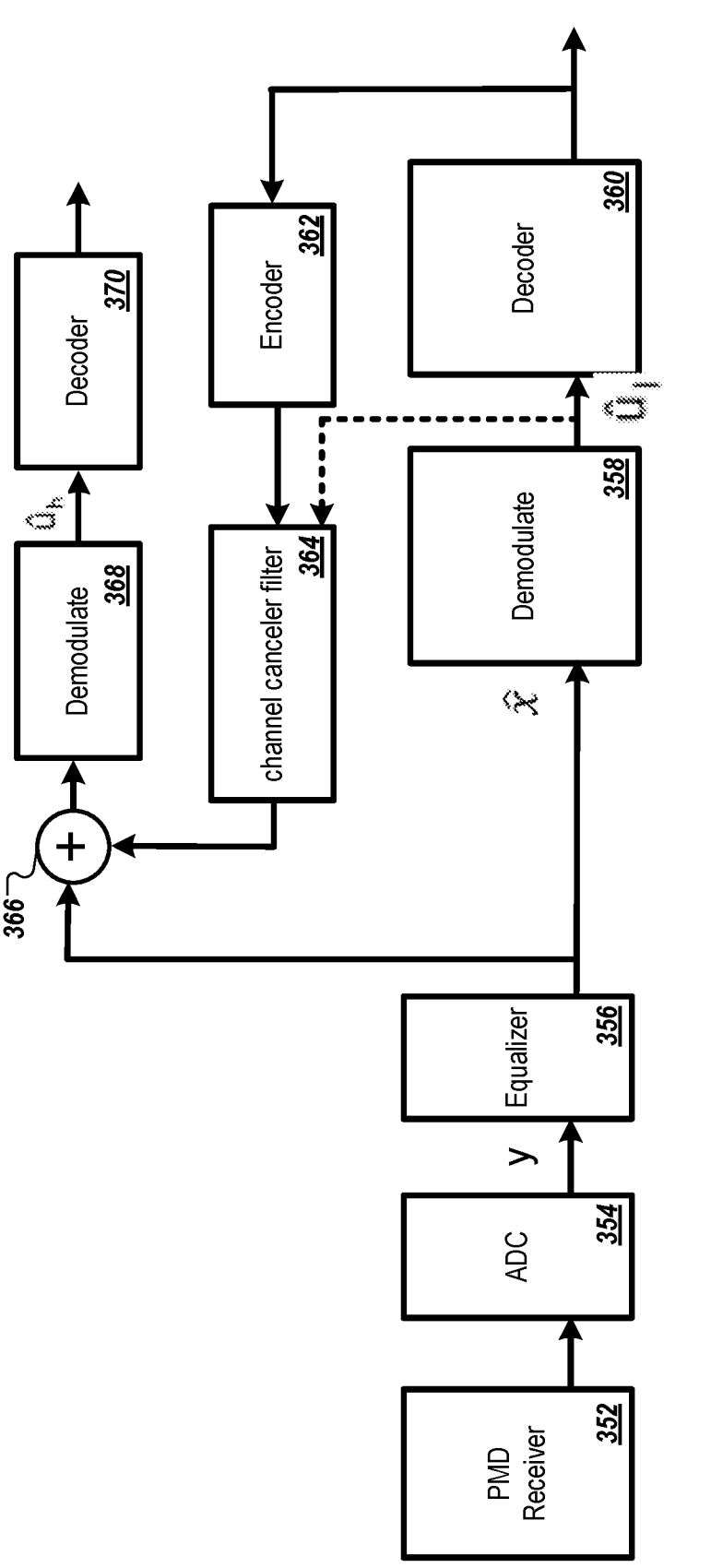
FIG. 3B illustrates an example NOMA receiver structure.

In some embodiments, the receivers 300, 350 illustrated in FIG. 3A and FIG. 3B, respectively, may comprise components that are similar to the components in FIG. 2 with similar functionality. The receivers 300, 350 may comprise a PMD receiver 302, 352, an ADC 304, 354, an equalizer 306, 356, a demodulate block 308, 358, a decoder 310, 360, an encoder 312, 362, a channel canceller filter 314, 364, a combiner 316, 366, a second equalizer 318 (in FIG. 3A but not present in FIG. 3B), a demodulate block 320, 368, and a decoder 322, 370. These components may have functionality that is similar to the functionality described with respect to FIG. 2.

In some embodiments, a processing device may be configured to combine the second downstream signal with the first downstream signal using non-orthogonal multiple access (NOMA). That is, the disclosed scheme combines two data channels on a single fiber established at the same wavelength and time (i.e., using NOMA). The two channels, the nominal-rate channel and the high-capacity channel, are separated in the transmit power domain.

In some embodiments, the nominal-rate channel may be transmitted at a higher power such that it can be decoded by a plurality of ONUs. To receive the high-capacity channel, the nominal-rate channel may be decoded and canceled out of the receive signal. The high-capacity channel may be transmitted with lower power and only ONUs with sufficient channel quality (i.e., those having sufficiently low signal attenuation or noise) may decode it.

Figure 4:
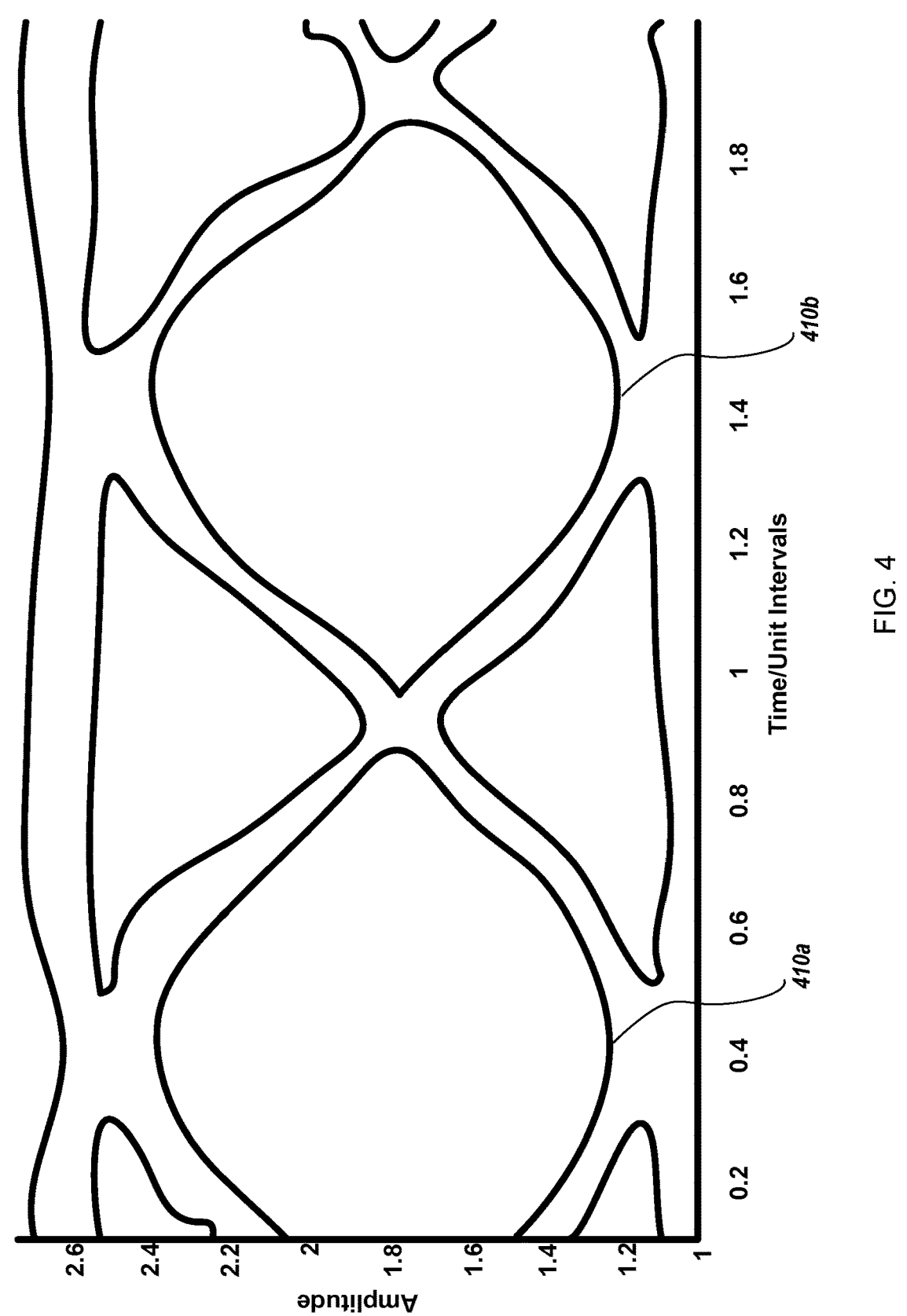
FIG. 4 illustrates an example non-return-to-zero (NRZ) transmission eye.
Figure 5:
FIG. 5 illustrates an example pulse amplitude modulation 4 (PAM-4) transmission eye.
Figure 6:
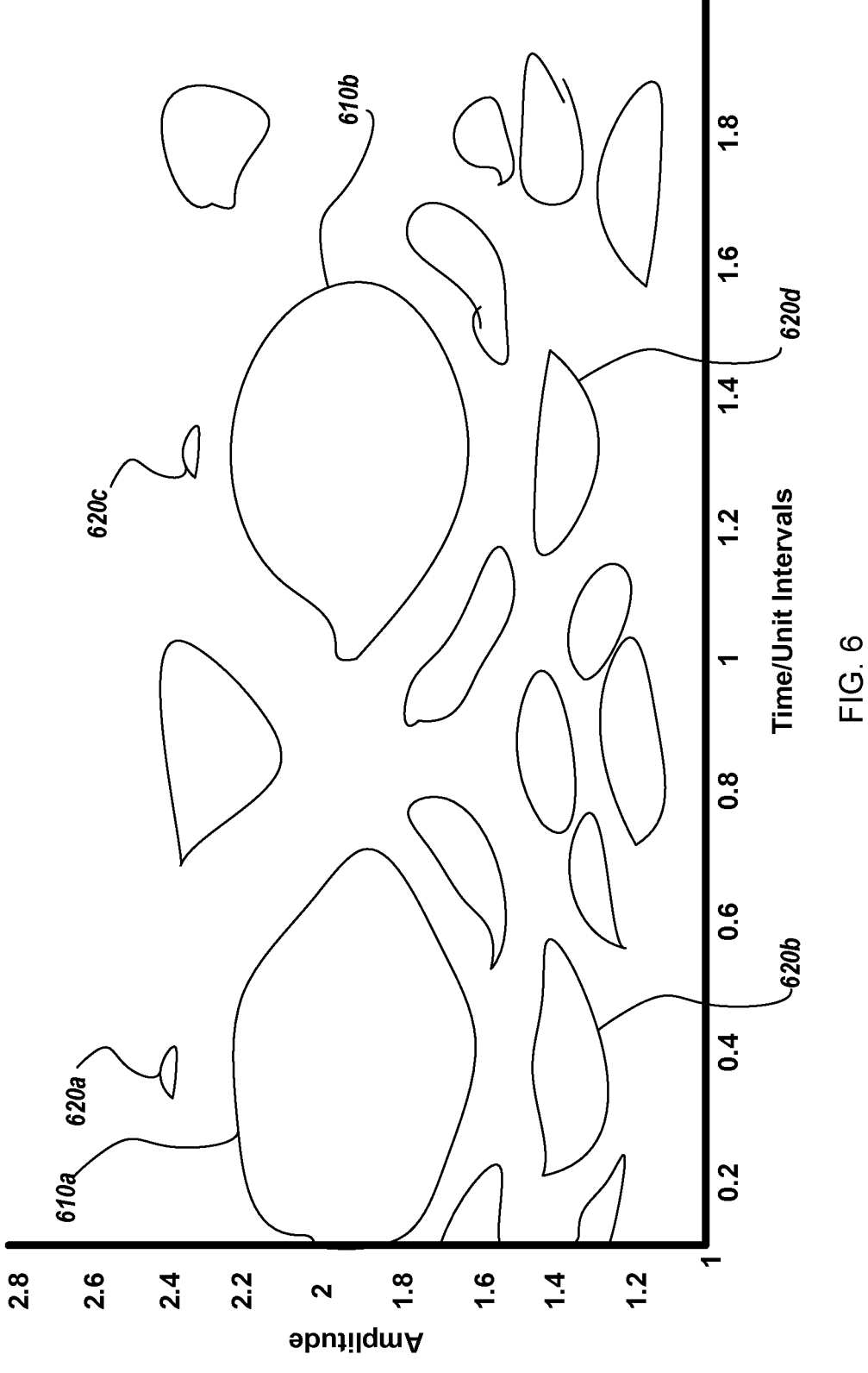
FIG. 6 illustrates an example NOMA transmission eye with NRZ main channel and NRZ high-capacity.

In some embodiments, as an example, transmission eyes using a NOMA transmission scheme 400 with an NRZ nominal-rate channel, as shown in FIG. 4, and a NOMA transmission scheme 500 with a PAM-4 nominal-rate channel, are shown in FIGS. 4 and 5 using an independent variable in time/unit intervals and a dependent variable in amplitude (using arbitrary units). Compared to the eye openings (410*a*, 410*b*) of the NRZ transmission, as illustrated in FIG. 4, or the eye openings (510*a*, 510*b*, 510*c*, 510*d*, 510*e*, 510*f*) of the PAM-4 transmission, as shown in FIG. 5, the NOMA transmission scheme 600, as shown in FIG. 6, may be selected to have a larger eye opening (610*a*, 610*b*) in the nominal-rate channel than the eye opening (i.e., upper eye opening 620*a*,620*c*, or lower eye opening 620*b*, 620*d*) in the high-capacity channel. (FIG. 6 uses an independent variable in time/unit intervals and a dependent variable in amplitude (using arbitrary units).) It should be noted that the NOMA scheme may not be limited to the use of NRZ modulation, but other modulation schemes may be used for different channels, e.g., NRZ for the nominal-rate channel and PAM-4 for the high-capacity channel.

In some embodiments, the symbol rate of the nominal-rate channel and the symbol rate of the high-capacity channel may also be different, e.g., the high-capacity channel may use half of the symbol rate of the nominal-rate channel or twice the symbol rate of the nominal-rate channel. In one example, the receive clock may be derived from the nominal-rate channel and used for receiving both the nominal-rate channel and the high-capacity channel.

In some embodiments, the error correction settings (e.g., FEC settings) for the nominal-rate channel and the high-capacity channel may be different. The high-capacity channel may use an error correction code (e.g., FEC code) that tolerates one or more of a higher raw BER, a lower input SNR, or the like.

In some embodiments, the PON optical receiver may be implemented with an avalanche photo-diode for optical-to-electrical conversion which may be highly nonlinear. Therefore, nonlinear equalization and nonlinear pre-compensation may be used to enhance performance, especially for reception of the high-capacity channel. In one example, a processing device may be configured to use one or more of non-linear equalization or non-linear pre-compensation to increase a signal quality for the second downstream signal compared to the signal quality for the first downstream signal.

Figure 7:
FIG. 7 illustrates an example NOMA transmission with different modulation levels at the transmitter.

In some embodiments, to cope with non-linear effects, the transmit amplitude of the high-capacity channel may be selected differently for different signal levels on the nominal-rate channel. As illustrated in FIG. 7 for a NOMA transmission scheme having time/unit intervals as an independent variable and amplitude in arbitrary units as the dependent variable, NRZ transmission on the nominal-rate channel and the high-capacity channel is provided.

In some embodiments, a processing device may be configured to compute a first offset compensation for the second downstream signal when a first bit value from the first channel is identified, or compute a second offset compensation for the second downstream signal when a second bit value from the first downstream signal is identified. In one example, the first bit value may be different from the second bit value.

In some embodiments, for a logical ONE transmitted on the nominal-rate channel, the signal amplitude may be 5/3 of the signal amplitude of a logical ZERO transmitted at the nominal-rate channel. As a result, the eye openings (720*a*, 720*b*, 720*c*, 720*d*) of the high-capacity channel during transmission of ONE (720*a*, 720*c*) and ZERO (720*b*, 720*d*) over the nominal-rate channel may be the same at the receiver side, unlike the scenario provided in FIG. 6 in which the eye openings of the high-capacity channel during transmission of ONE (620*a*, 620*c*) are smaller than the eye openings of the high-capacity channel during transmission of ZERO (620*b*, 620*d*).

Figure 8:
FIG. 8 illustrates an example transmitter for main and high-capacity channel for nonlinear modulation scheme.

In some embodiments, as illustrated in FIG. 8, for non-linear modulation at the transmitter 800, transmitter processing may be adjusted based on the transmission of a logical ONE or a logical ZERO. The transmitter 800 may comprise an encoder 802 that may be configured to direct a nominal-rate signal (e.g., bit sequence $u_l$) to one or more of the modulate block 840 or to the modulate block 808. The transmitter 800 may further comprise an encoder 806 that may be configured to direct a high-capacity signal (e.g., bit sequence $u_h$) to the modulate block 808. The modulator block 804 may be configured to direct a modulated signal based on the nominal-rate signal (e.g., bit sequence $u_l$) to the combiner 810 and the modulator block 808 may be configured to direct a modulated signal based on the high-capacity signal (e.g., bit sequence $u_h$) to the combiner 810. The combiner 810 may be configured to combine the nominal-rate signal (e.g., bit sequence $u_l$) and the high-capacity signal (e.g., bit sequence $u_h$) to generate the combined transmit signal x. The combined transmit signal x may be directed to the PMD transmitter 812 to be transmitted to one or more ONUS using one or more fibers, splitters, or the like.

In some embodiments, for time instance t, the combined transmit signal x may be computed using:

$$x_t = \text{mod } (u_{l,t}) + \begin{cases} \alpha_{h,0} \text{ mod } (u_{h,t}) \text{ for } u_{l,t} = 0 \\ \alpha_{h,1} \text{ mod } (u_{h,t}) \text{ for } u_{l,t} = 1 \end{cases}$$

with different scale factors $\alpha_{h,0} < 1$ and $\alpha_{h,1} < 1$, depending on the nominal-rate channel transmitting a one or a zero. For multilevel modulation on the nominal-rate channel, a different scale factor for each modulation level of the nominal-rate channel may be used.

In some embodiments, at the receiver side, a non-linear equalizer may be used. Using the non-linear equalizer, the offset compensation for the high-capacity channel equalizer may use different coefficients depending on the received symbol of the main channel, e.g. $g_{dcblock,0}$ when 0 is received on the main channel and $g_{dcblock,1}$ when 1 is received on the nominal-rate channel.

In some embodiments, there may be different sets of coefficients for different transmitted symbols for the high-capacity channel equalizer, $g_{eqhigh0,1}, \ldots, g_{eqhigh0,N_{eqhigh}}$, and $g_{eqhigh1,1}, \ldots, g_{eqhigh1,N_{eqhigh}}$. The overall receive equalization for the given received bit may include a combination of coefficients from the two equalizers computed using:

$$\hat{x}_{h,t} = \sum_{i=1}^{N_{eqhigh}} \left( \hat{y}_{h,t-i} - \begin{cases} g_{dcblock,0} & \text{for } \hat{u}_{l,t} = 0 \\ g_{dcblock,1} & \text{for } \hat{u}_{l,t} = 1 \end{cases} \right) \cdot \begin{cases} g_{eqhigh0,i} & \text{for } \hat{u}_{l,t} = 0 \\ g_{eqhigh1,i} & \text{for } \hat{u}_{l,t} = 1 \end{cases}$$

In some embodiments, other types of non-linear equalizer structures (e.g., maximum likelihood sequence estimation (MLSE) or Bahl-Cocke-Jelinek-Raviv (BCJR)) may be used. As a result, the nominal-rate channel bits may be input to the high-capacity channel equalizer.

In some embodiments, in the downstream direction, to maintain sufficient sensitivity of the ONUs that experience high attenuation, the opening of the eye diagram of the nominal-rate channel may not be compromised by the power of the high-capacity channel transmission. In one example, additional transmit power may be used for the NRZ symbols carrying both channels when the nominal-rate channel is intended to be received by these remote ONUs.

In some embodiments, the high-capacity channel may not transmit continuously and, even with an active high-capacity channel, transmission parameters such as signal amplitude, modulation, and FEC settings may be changed. In one example, a processing device may be configured to compute transmission parameter values for the first downstream signal that are different from transmission parameter values for the second downstream signal. The transmission parameters may include one or more of a modulation setting, a forward error correction (FEC) setting, a symbol rate, a frame structure, a communication protocol, a burst setting, or the like.

In some embodiments, the frame structure for the high-capacity channel may be different from the frame structure for the nominal-rate channel. In some embodiments, FEC may be selected to achieve a threshold channel quality for one or more ONUs. In some embodiments, a modulation setting may be selected to achieve a threshold channel quality for one or more ONUs.

In some embodiments, downstream transmission may use burst for the high-capacity channel. In one example, when burst is used for the high-capacity channel on a downstream transmission, one or more bits may be used to indicate to an ONU that a burst transmission is incoming. This scenario may differ from other scenarios in which the ONU may monitor all incoming transmission to determine whether the incoming transmission is intended for the particular ONU or for a different ONU. Therefore, the one or more bits used to indicate to the ONU that a burst transmission is coming may be used to target a burst transmission to a particular ONU. In some examples, a burst transmission may be used in the downstream for the high-capacity channel and a broadcast transmission may be used in the downstream for the nominal-rate channel. In some examples, an upstream transmission from an ONU to the OLT may use one or more of burst transmission or broadcast transmission.

Figure 9:
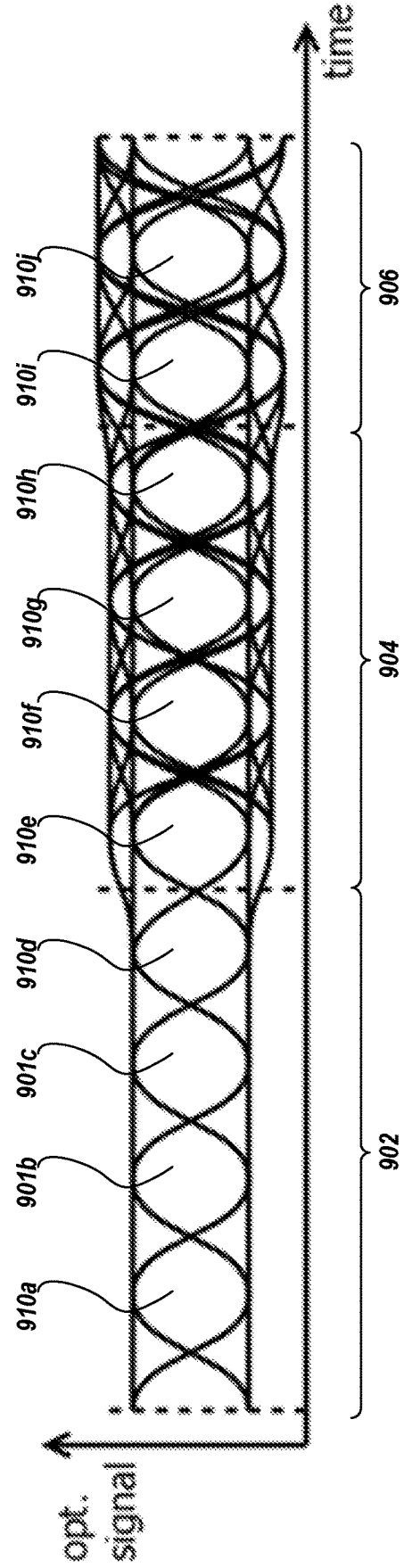
FIG. 9 illustrates a passive optical network transmission with different settings for the high-capacity channel.

In some embodiments, as illustrated in FIG. 9, a PON transmission 900 is provided with different settings for the high-capacity channel. The high-capacity channel may be disabled 902, or use lower power 904, or use higher power 906. The inner eye (910a, 910b, 910c, 910d, 910e, 910f, 910g, 910h, 910i, 910j), which corresponds to the channel quality of the nominal-rate channel) may be constant.

Figure 10:
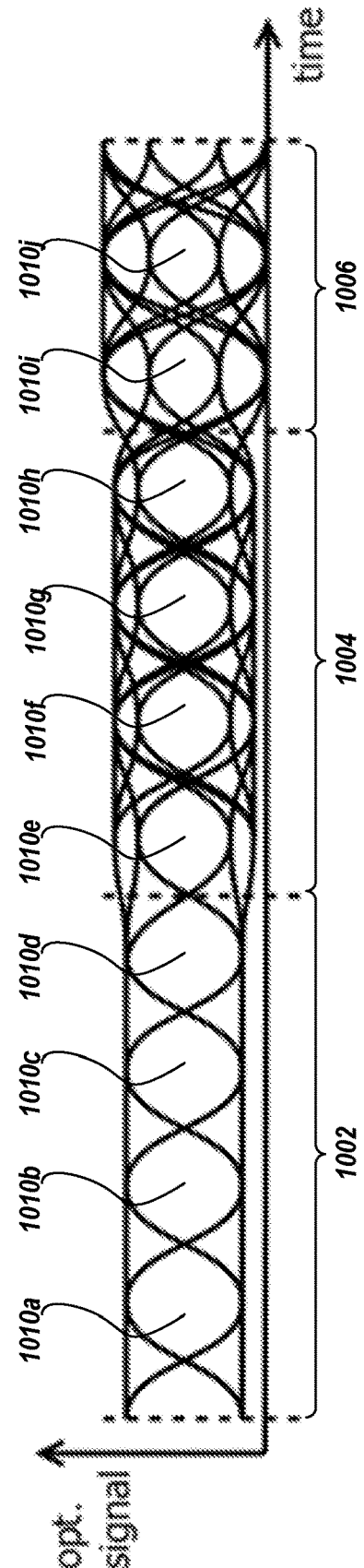
FIG. 10 illustrates a passive optical network transmission with different settings for the high-capacity channel.

In some embodiments, as illustrated in FIG. 10, a PON transmission 1000 is provided with different settings for the high-capacity channel and with an average logical ZERO level and logical ONE level for the nominal-rate channel that may be constant. The high-capacity channel may be disabled 1002, or use lower power 1004, or use higher power 1006. The inner eye for the nominal-rate channel may have a different size when: (i) the high-capacity channel is disabled (1010a, 1010b, 1010c, 1010d when the) (ii) when the high-capacity channel uses lower power (1010e, 1010f, 1010g, 1010h) and (iii) when the high-capacity channel uses higher power (1010i, 1010j). Nonetheless, the average logical ZERO level and the average logical ONE level for the nominal-rate channel may be constant.

In some embodiments, as illustrated in FIG. 11, a PON transmission 1100 is provided with different settings for the high-capacity channel and with an average logical ZERO level and logical ONE level for the nominal-rate channel that may be constant. In addition, the maximum extinction ratio may be constant. The high-capacity channel may be disabled 1002, or use lower power 1004, or use higher power 1006. The inner eye for the nominal-rate channel may have a different size when: (i) the high-capacity channel is disabled (1110a, 1110b, 1110c, 1110d when the) (ii) when the high-capacity channel uses lower power (1110*e*, 1110*f*, 1110*g*, 1110*h*) and (iii) when the high-capacity channel uses higher power (1110*i*, 1110*j*). Nonetheless, the average logical ZERO level and the average logical ONE level for the nominal-rate channel may be constant, and the maximum extinction ratio may be constant.

In some embodiments, the channel conditions for the ONUs receiving the high-capacity channel and the channel conditions for the ONUs receiving the nominal-rate channel may be used to select the transmission settings of the high-capacity channel. In some embodiments, a processing device may be configured to compute, at the OLT, a transmit power increase or an extinction ratio increase when the combined downstream signal is transmitted.

In some embodiments, the channel quality of the nominal-rate channel may be lowered slightly, when the high-capacity channel is added because the high-capacity channel may appear as additional noise in the nominal-rate channel. In one embodiments, the OLT transmitter supporting the high-capacity channel may have a higher transmit power and/or higher extinction ratio than an OLT transmitter intended to transmit the nominal-rate channel, or intended to transmit a high-capacity channel without losses with respect to the nominal-rate channel (see e.g., FIG. 9).

In some embodiments, the OLT transmitter may not use a higher transmit power or a higher extinction ratio (see e.g., FIGS. 10 and 11) but may be able to support ONUs on the nominal-rate channel with no margin on the signal quality. In this case, the ONUs receiving the nominal-rate channel may experience a reduced eye opening, and thus a penalty on the signal quality, when the high-capacity channel is transmitted. In some examples, when the data packets on the nominal-rate channel are transmitted to a particular ONU (which may have an insufficient margin on the transmission channel), the high-capacity channel may be paused (or transmitted with negligibly low power to avoid errors in the nominal-rate channel). In some examples, to avoid receive errors in the nominal-rate channel, the penalty on the signal quality for the nominal-rate channel may be below the margin of the nominal-rate channel for the ONU receiving the nominal-rate channel.

In some embodiments, the high-capacity channel may be used to serve some particular ONUs while other ONUs may be served on the nominal-rate channel. In other embodiments, the same ONU may be served through the nominal-rate channel and the high-capacity channel at the same time to transmit a short burst with very high data rate.

In some embodiments, a processing device may be configured to transmit duplicate data on the second channel (e.g., high-capacity channel) to increase forward error correction (FEC) protection. In some examples the high-capacity channel may be used to provide a higher FEC protection rather than a higher data rate by: (i) transmitting duplicate data on the high-capacity channel, or (ii) sending additional parity bytes on the high-capacity channel to increase the FEC decoding in the nominal-rate channel.

In some embodiments, a processing device may be configured to transmit data on the second channel (e.g., high-capacity channel) to reduce latency. In some examples, transmitting data on the high-capacity channel, compared to transmitting data on the nominal-rate channel, may be up to: 1.5× faster, 2.0× faster, 2.5× faster, 3.0× faster, or the like.

In some examples, when the nominal-rate channel is congested with a large transmission burst, the high-capacity channel may be used to transmit a high-latency signal. Alternatively, or in addition, when the high-capacity channel is congested with a large transmission burst, the nominal-rate channel may be used to transmit a high-latency signal.

In some embodiments, the high-capacity channel may be available at any time, even though its capacity may vary. This availability for the high-capacity channel may be used for services which use very low latency that may not accept longer interruptions, which may be caused by transmissions to other ONUS over the nominal-rate channel or over the overhead channel established within the nominal-rate channel. The high-capacity channel may be used in these scenarios as a low latency channel, providing low latency services.

In some embodiments, a processing device may be configured to transmit data on the second channel (e.g., a high-capacity channel) to reduce power usage. When data is transmitted using a broadcast transmission, each receiving ONU may process an entire encryption chain for a nominal-rate channel. When data is transmitted using a high-capacity channel, an ONU may be configured to monitor a particular high-capacity channel rather than a plurality of broadcast channels.

In some embodiments, even though the high-capacity channel may use additional operations and thus adds additional computations, in the receiver, the high-capacity channel may be used to save power and complexity. In some PON systems, the ONU receiver may not be aware of the arrival time of the data packets addressed to the ONU. Therefore, each ONU may perform FEC decoding, packet processing (and decryption) on the complete data stream, while only a fraction of data may be relevant for the ONU.

In some embodiments, the high-capacity channel, may be transmitted to a specific ONU or a specific group of ONUs. An ONU which may be served by the high-capacity channel may save power because the ONU may not receive all data on the main channel for all the time. This power reduction scheme may be used for the transmission of the overhead channels on the nominal-rate channel and during the reception of data on the high-capacity channel. The corresponding transmission times may be known in advance.

This functionality for targeting a particular downstream transmission to a particular ONU to reduce power usage may be used for the nominal-rate channel. The high-capacity channel may be configured to provide location information or other configuration information pertaining to the nominal-rate channel using a protocol associated with the high-capacity channel. Consequently, the high-capacity channel may provide reduced power usage by: (i) targeting the high-capacity channel to a particular ONU, or (ii) providing information about the nominal-rate channel that may be used to reduce the power usage for the nominal-rate channel.

Figure 12:
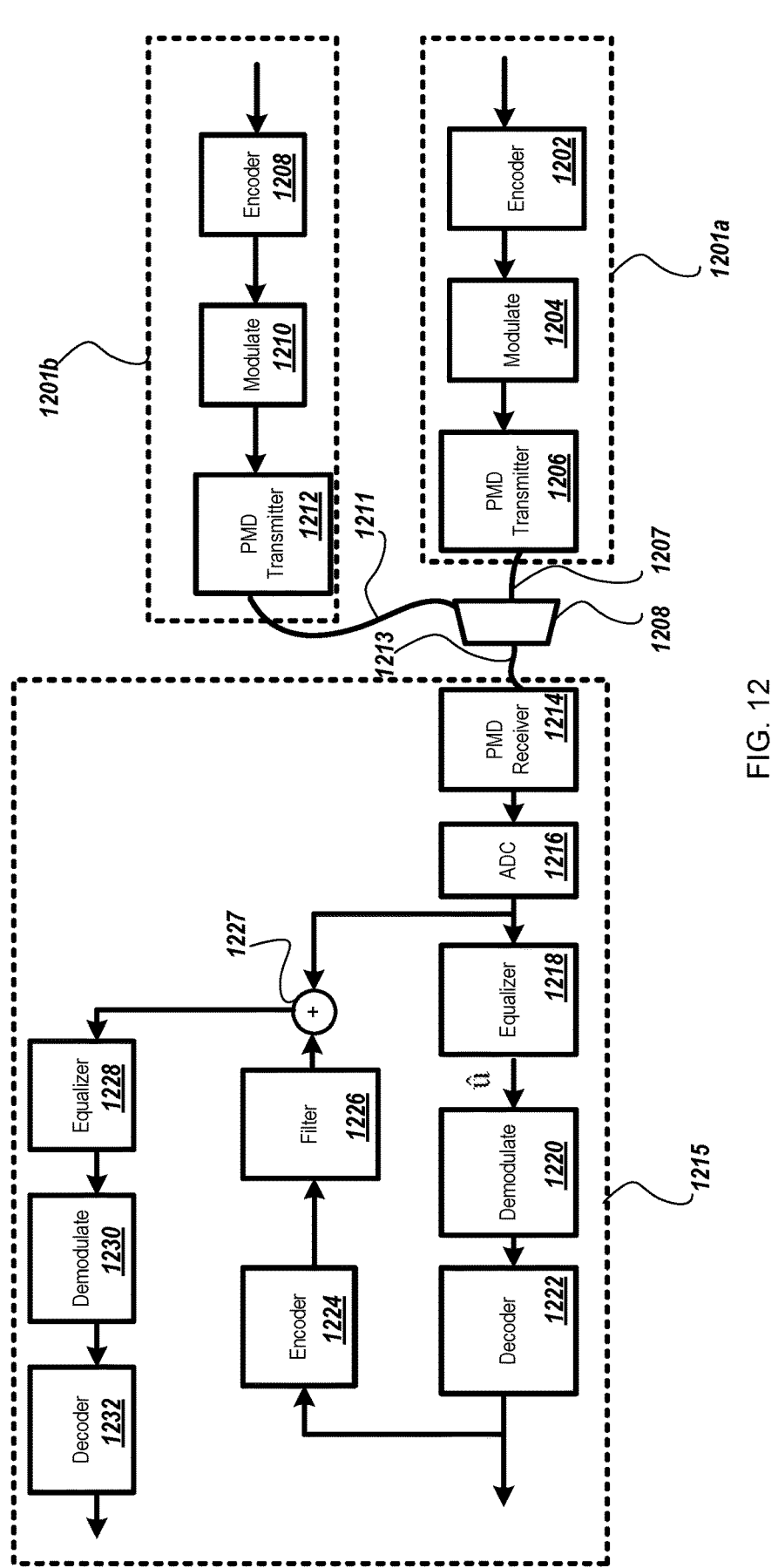
FIG. 12 illustrates an example upstream NOMA transmission.

The NOMA scheme may be used also in upstream, as illustrated in FIG. 12. Hereby, the OLT 1215 may allow two ONUs 1201*a*, 1201*b* with appropriate receive power levels at the OLT 1215 to transmit at the same time, e.g., one ONU 1201*a* with low channel attenuation and another ONU 1201*b* with high channel attenuation.

In some embodiments, an OLT 1215 for upstream reception in a PON 1200 may comprise a PMD receiver 1214 configured to receive, at the OLT 1215, a combined upstream signal comprising a first upstream signal and a second upstream signal. The upstream signal may be received from a first ONU 1201*a* and the second upstream signal may be received from a second ONU 1201*b*. In some examples, the first upstream signal may have a greater receive power than the second upstream signal.

In some embodiments, the OLT 1215 may comprise a processing device configured to decode, at the OLT 1215, the first upstream signal, and decode, at the OLT 1215, the second upstream signal by canceling the first upstream signal from the combined upstream signal. In one example, the processing device may be configured to: cause a hard decision to be performed on the first upstream signal to generate a first channel cancellation filter to cancel the first upstream signal from the combined upstream signal to generate the second upstream signal.

In some embodiments, the upstream signal that may be received with the higher receive power, from an ONU (e.g., 1201*a*), may be decoded before the upstream signal, received from the ONU 1201*b*, with the lower received power. The recovered signal from, e.g., ONU 1201*a*, may re-encoded, filtered, and canceled from the combined upstream signal to recover the second upstream signal from the second ONU (e.g., 1201*b*).

In some embodiments, the processing device may be configured to compute a minimum receive power difference between a first receive power for the first ONU (e.g., 1201*a*) and a second receive power for the second ONU (e.g., 1201*b*). To decode messages from multiple ONUs 1201*a*, 1201*b* transmitting at the same time, the receive power of the overlapping signals at the OLT 1215 may be within certain power limits. In one example, there may be a minimum difference of the power levels used to distinguish between the different modulation levels.

In some embodiments, the desired power levels may be achieved in various ways. In one example, the OLT 1215 may select the ONU (e.g., 1201*a*, 1201*b*, or the like) which may be permitted to transmit simultaneously so that the received power levels at the OLT 1215 achieve the minimum difference of the power levels. That is, the processing device may be configured to select the first ONU 1201*a* and the second ONU 1201*b* based on a predicted receive power difference. The predicted receive power difference may facilitate a minimum power difference between a first receive power, at the OLT 1215, for the first ONU 1201*a* and a second receive power, at the OLT 1215, for the second ONU 1201*b*.

In some embodiments, the processing device may be configured to select a first transmit power for the first ONU 1201*a*, and select a second transmit power for the second ONU 1201*b*. The first transmit power and the second transmit power may be selected to facilitate a minimum receive power difference between a first receive power for the first ONU 1201*a* and a second receive power for the second ONU 1201*b*. That is, the OLT 1215 may adjust the transmit power of the ONUs 1201*a*, 1201*b* transmitting simultaneously such that the minimum receive power levels are achieved.

In some embodiments, the minimum receive power difference may be achieved by using one or more of: (i) selecting a first ONU and a second ONU to achieve the minimum receive power difference, or (ii) adjusting the transmit power of the first ONU or the second ONU to achieve the minimum receive power difference.

In some embodiments, adjusting the transmit power of one or more of the first ONU or the second ONU to achieve the minimum receive power difference may provide enhanced performance compared to selecting the first ONU or the second ONU based on a predicted or historical receive power difference.

In some embodiments, the OLT 1215 may be configured to receive a first upstream signal from a first ONU 1201*a* and a second upstream signal from a second ONU 1201*b* in which both the first ONU 1201*a* and the second ONU 1201*b* operate using the nominal-rate channel rather than the high-capacity channel. In this example, one or more of the first ONU 1201*a* or the second ONU 1201*b* may be selected to achieve the minimum receive power difference, or one or more of the transmit power of the first ONU 1201*a* or the transmit power of the second ONU 1201*b* may be adjusted to achieve the minimum receive power difference.

In some embodiments, the processing device may be configured to compute a first sampling point for the first ONU 1201*a* and a second sampling point for the second ONU 1201*b* to align the first ONU 1201*a* and the second ONU 1201*b* in time. That is, in contrast to the downstream NOMA channel, the upstream transmissions from different ONUs 1201*a*, 1201*b* may not be fully aligned in time. Therefore, the sampling point may be adjusted, such as in the equalizer, for decoding the first ONU 1201*a* or the second ONU 1201*b*.

In some embodiments, the control of the ONU transmit power may be used for upstream NOMA, because it may not be possible to select ONUs with appropriate channel attenuation to be combined for simultaneous transmission. When this situation occurs, receive power measurement at the OLT may be used to control the optical transmit power at one or more of the first ONU or the second ONU to achieve the minimum receive power difference.

In some embodiments, the OLT 1215 may comprise one or more of: a PMD receiver 1214, an ADC 1216, an equalizer 1218, a demodulate block 1220, a decoder 1222, an encoder 1224, a filter 1226, a combiner 1227, an equalizer 1228, a demodulate block 1230, or a decoder 1232. The PMD receiver 1214 may be configured to receive an optical upstream signal and convert that optical upstream signal to an upstream electrical signal. The ADC 1216 may be configured to receive the upstream electrical signal and convert that upstream electrical signal to an upstream digital signal. The equalizer 1218 may be configured to mitigate inter-symbol interference for the upstream digital signal received from the ADC 1216. The demodulate block 1220 may be configured to demodulate the signal receiver from the equalizer 1218. The decoder may be configured to decode the demodulated signal received from the demodulate block 1220. The signal output from the decoder may be the recovered first upstream signal (e.g., a bit sequence corresponding to the bit sequence transmitted from the first ONU 1201*a* on the combined upstream signal).

In some embodiments, the recovered first upstream signal output from the decoder block 1222 may be directed to the encoder 1224 for re-encoding. The re-encoded signal from the encoder 1224 may be directed to the filter 1226 to generate a cancelation signal. The filter 1226 may configure the cancellation signal to cancel the first upstream signal from a combined upstream signal received at the combiner from the ADC 1216 output. The combiner may be configured to direct the cancelled signal to the equalizer 1228 to mitigate inter-symbol interference. The equalizer 1228 may be configured to output the signal to the demodulate block 1230 to output a demodulated signal to be directed to the decoder block 1232. The decoder block may decode the signal to recover the second upstream signal (e.g., a bit sequence corresponding to the bit sequence transmitted from the second ONU 1201*b* on the combined upstream signal).

In some embodiments, the first ONU 1201*a* may comprise an encoder 1202, a modulate block 1204, and a PMD transmitter 1206. The encoder 1202 may be configured to encode a first upstream signal (e.g., a bit sequence). The modulate block 1204 may be configured to receive the encoded first upstream signal from the encoder 1202 and modulate that signal. The PMD transmitter 1206 may be configured to receive the modulated signal from the modulate block 1204 and convert the modulated signal to an optical signal for transmission via the fiber 1207 to the splitter 1208 for combination with upstream signals from other ONUs (e.g., 1201*b*) and transmission using the fiber 1213 to the OLT 1215.

In some embodiments, the second ONU 1201*b* may comprise an encoder 1208, a modulate block 1210, and a PMD transmitter 1212. The encoder 1208 may be configured to encode a first upstream signal (e.g., a bit sequence). The modulate block 1210 may be configured to receive the encoded first upstream signal from the encoder 1208 and modulate that signal. The PMD transmitter 1212 may be configured to receive the modulated signal from the modulate block 1210 and convert the modulated signal to an optical signal for transmission via the fiber 1211 to the splitter 1208 for combination with upstream signals from other ONUs (e.g., 1201*a*) and transmission using the fiber 1213 to the OLT 1215.

Figure 13:
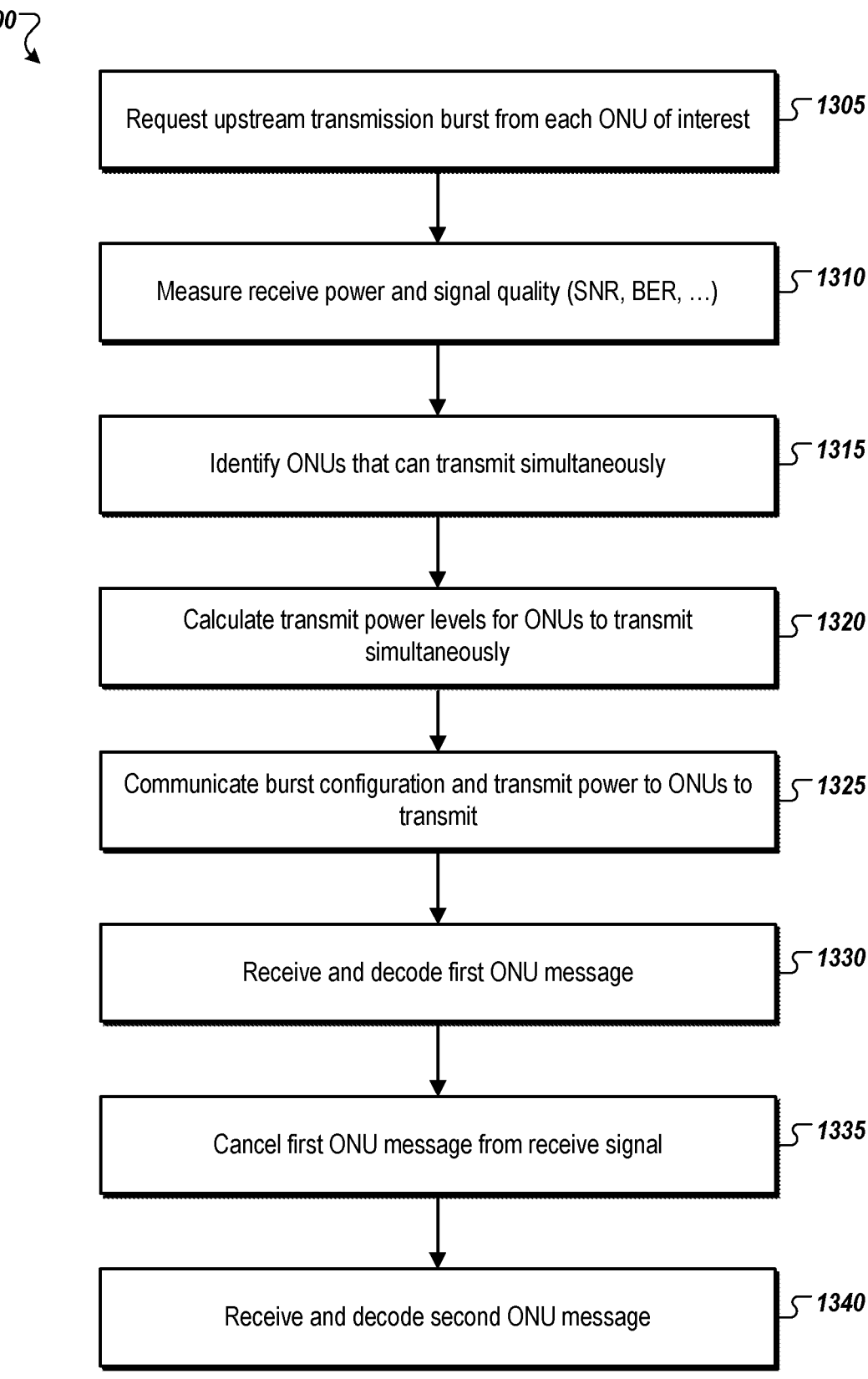
FIG. 13 illustrates operations for upstream NOMA transmission.

In some embodiments, the procedure 1300 for upstream NOMA transmission may be provided as illustrated in FIG. 13. The OLT may request upstream transmission burst from each ONU of interest (e.g., with full TX power), as shown in block 1305. The OLT may measure the receive (RX) power and signal quality (e.g., BER, SNR, SNR margin, or the like), as shown in block 1310. The receive power levels may be stored in a database. The OLT may be configured to identify ONUS that may transmit simultaneously, as shown in block 1315. The OLT may be configured to calculate transmit power levels for ONUs to transmit simultaneously, as shown in block 1320. The OLT may be configured to communicate burst configuration and transmit power to ONUs to transmit, as shown in block 1325. The OLT may be configured to receive and decode a first ONU message, as shown in block 1330. The OLT may be configured to cancel the first ONU message from the receive signal, as shown in block 1335. The OLT may be configured to receive and decode the second ONU message, as shown in block 1340.

In some embodiments, when selecting the ONUs to transmit simultaneously, the ONUs may be selected such that the transmit power of the ONU to be received second may be reduced, while maintaining the signal quality at a threshold sufficient to receive the packet. In one example, the symbol rates of the first ONU and the second ONU transmission may be selected differently. The highest rate may be used for the first ONU transmission and the same rate or a lower rate may be used for the second ONU signal. Consequently, the receive path may operate at the highest rate.

In some embodiments, a processing device may be configured to send, from the ONU to the OLT, non-orthogonal multiple access (NOMA) downstream reception capability. The processing device may be configured to send, from the ONU to the OLT, diagnostic parameters for the ONU. The processing device may be configured to send, from the ONU to the OLT, channel quality information.

In some embodiments, to establish the high-capacity channel for an ONU configured to synchronize to the OLT, several operations 1400 may be performed, as illustrated in FIG. 14. In one example, an ONU may be configured to synchronize using a nominal-rate channel, as shown in block 1405. In one example, an OLT may be configured to request capabilities from the synchronizing ONU using the nominal-rate channel, as shown in block 1410. In one example, the OLT may be configured to determine that the synchronized ONU supports NOMA downstream reception and request diagnostic parameters (e.g., BER, SNR, SNR margin, receive optical power, or the like), as shown in block 1415. In one example, the OLT may be configured to determine the capacity of the high-capacity channel for the synchronized ONU, as shown in block 1420. In one example, the OLT may be configured to determine modulation, rate, and FEC settings for the high-capacity channel, as shown in block 1425. In one example, the OLT may be configured to start transmission on the high-capacity channel for the synchronized ONU, as shown in block 1430.

In some embodiments, synchronization may be performed on the nominal-rate channel because it may not be determined in advance whether the ONU supports the high-capacity channel. After the ONU has been synchronized for upstream and downstream transmission, the capabilities of the ONU may be requested to identify ONU support for the high-capacity channel. In some examples, when a first upstream signal is received from a first ONU and a second upstream signal is received from a second ONU, the first ONU and the second ONU may be synchronized using one or more of: a digital sampling filter, a sampling rate filter, a sample rate converter, a multiphase filter comprising a plurality of linear filters that may be switching based on phase alignment between the first upstream signal and the second upstream signal, linear interpolation, the like, or a combination thereof. In one example, the signal used for synchronization may be taken from in front of the equalizer and before the summation point (e.g., between 1216 and 1227 in FIG. 12), after the summation point, (e.g., between 1227 and 1228 in FIG. 12), or any other suitable point.

In some embodiments, when the nominal-rate channel is being used for synchronization and a high-capacity channel has been established, the high-capacity channel may be used for low-latency traffic. Synchronization on the nominal-rate channel may use a lot of time which may result in the nominal-rate channel being blocked for a prolonged period of time. The high-capacity channel may be configured to carry low-latency traffic in this scenario.

Figure 15:
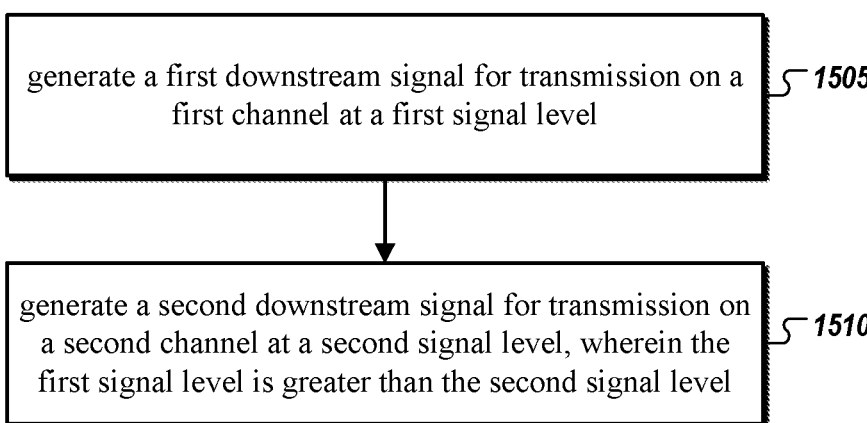
FIG. 15 illustrates a process flow for an example downstream transmission in an optical line terminal.

FIG. 15 illustrates a process flow of an example method 1500 of downstream transmission in a PON, in accordance with at least one embodiment described in the present disclosure. The method 1500 may be arranged in accordance with at least one embodiment described in the present disclosure.

Figure 18:
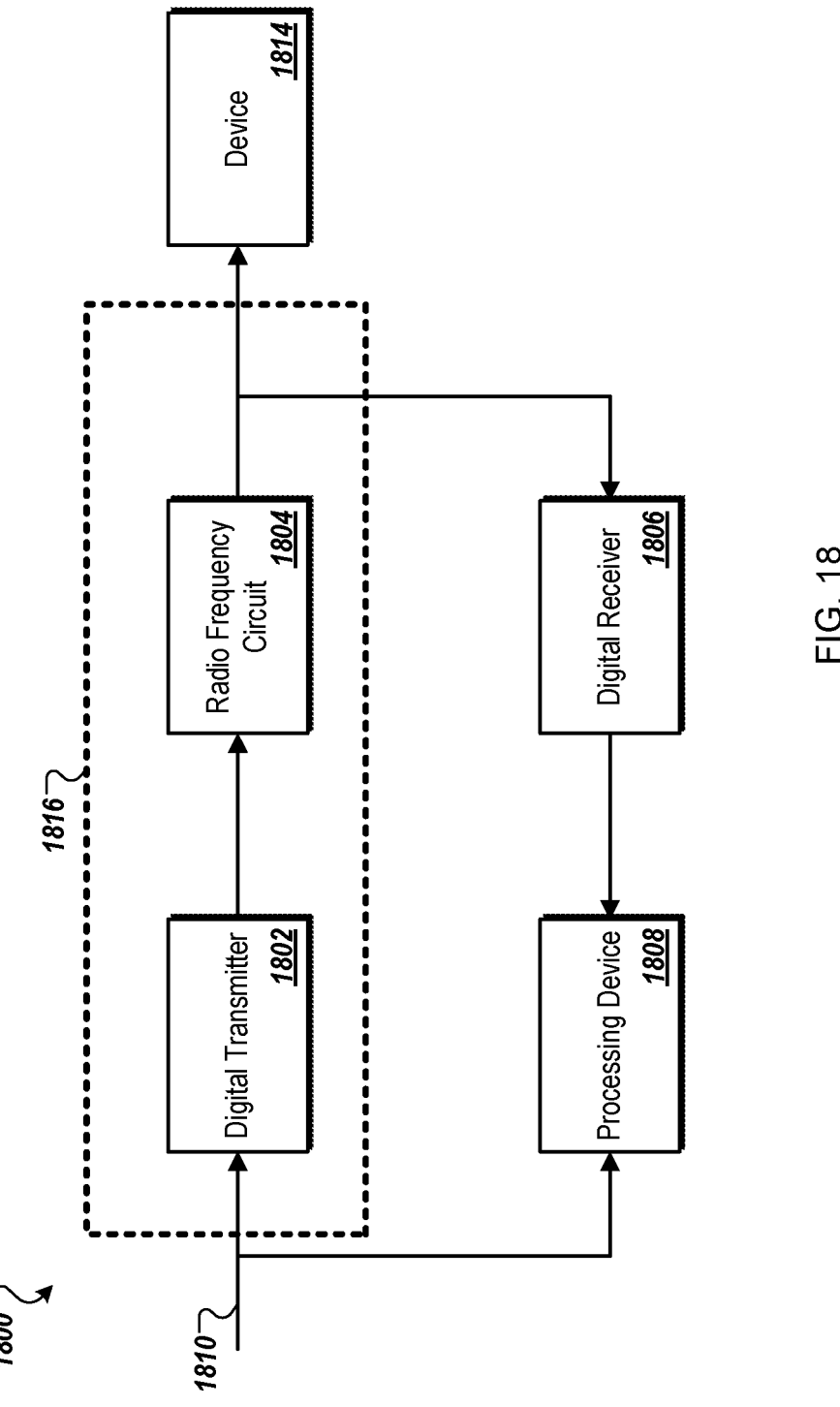
FIG. 18 illustrates an example communication system for a passive optical network.
Figure 19:
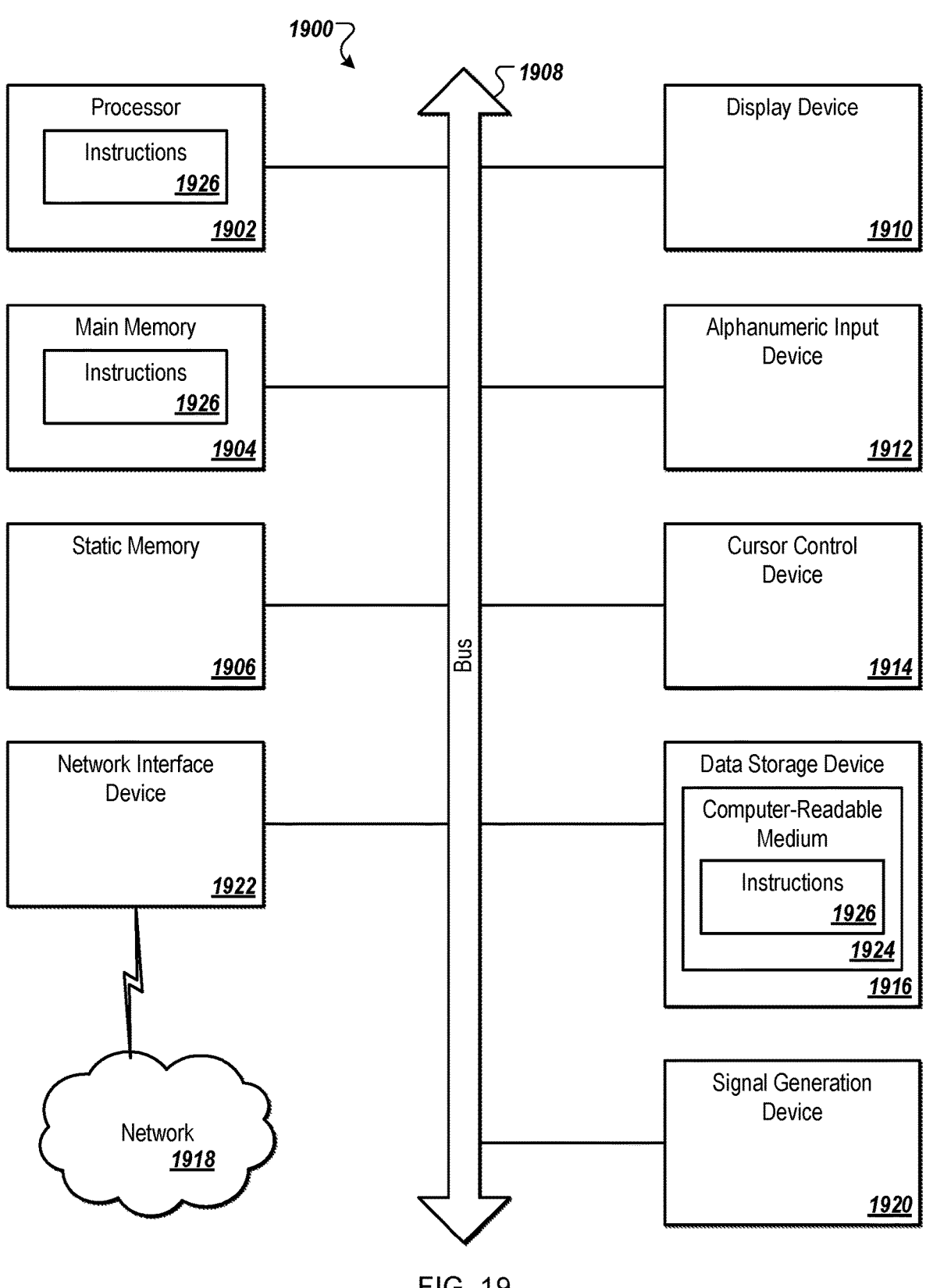
FIG. 19 illustrates a diagrammatic representation of a machine in the example form of a computing device within which a set of instructions, for causing the machine to perform any one or more of the methods discussed herein, may be executed.

The method 1500 may be performed by processing logic that may include hardware (circuitry, dedicated logic, etc.), software (such as is run on a computer system or a dedicated machine), or a combination of both, which processing logic may be included in the processing device 1902 of FIG. 19, the communication system 1800 of FIG. 18, or another device, combination of devices, or systems.

The method 1500 may begin at block 1505 where the processing logic may generate a first downstream signal for transmission on a first channel at a first signal level.

At block 1510, the processing logic may generate a second downstream signal for transmission on a second channel at a second signal level, wherein the first signal level is greater than the second signal level.

Modifications, additions, or omissions may be made to the method 1500 without departing from the scope of the present disclosure. For example, in some embodiments, the method 1500 may include any number of other components that may not be explicitly illustrated or described.

Figure 16:
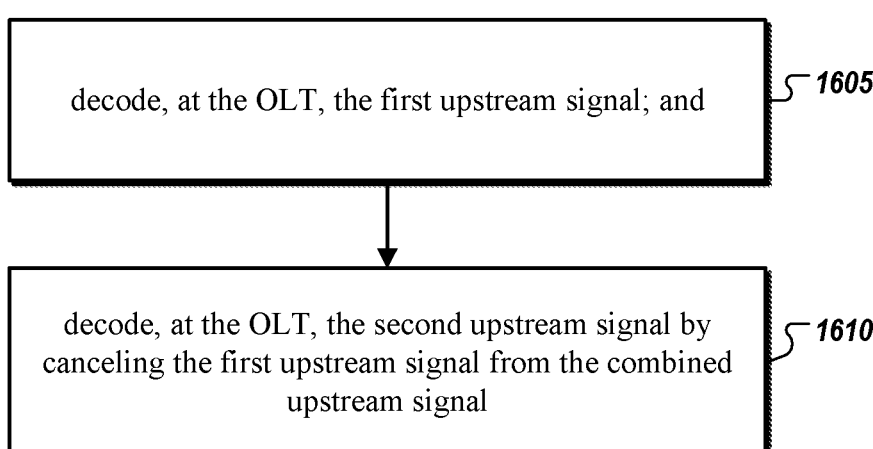
FIG. 16 illustrates a process flow for an example upstream transmission in an optical line terminal.

FIG. 16 illustrates a process flow of an example method 1600 that may be used for upstream reception in a PON, in accordance with at least one embodiment described in the present disclosure. The method 1600 may be arranged in accordance with at least one embodiment described in the present disclosure.

The method 1600 may be performed by processing logic that may include hardware (circuitry, dedicated logic, etc.), software (such as is run on a computer system or a dedicated machine), or a combination of both, which processing logic may be included in the processing device 1902 of FIG. 19, the communication system 1800 of FIG. 18, or another device, combination of devices, or systems.

The method 1600 may begin at block 1605 where the processing logic may decode, at the OLT, the first upstream signal.

At block 1610, the processing logic may decode, at the OLT, the second upstream signal by canceling the first upstream signal from the combined upstream signal.

Modifications, additions, or omissions may be made to the method 1600 without departing from the scope of the present disclosure. For example, in some embodiments, the method 1600 may include any number of other components that may not be explicitly illustrated or described.

Figure 17:
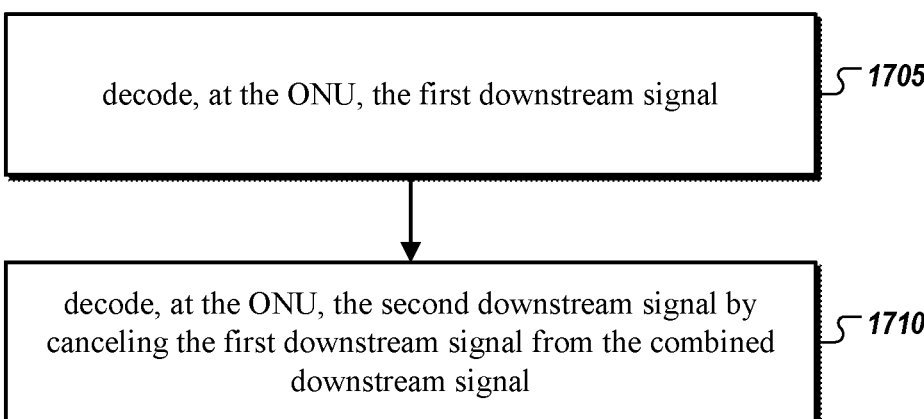
FIG. 17 illustrates a process flow for an example downstream transmission in an optical network unit.

FIG. 17 illustrates a process flow of an example method 1700 that may be used for downstream receiving in a PON, in accordance with at least one embodiment described in the present disclosure. The method 1700 may be arranged in accordance with at least one embodiment described in the present disclosure.

The method 1700 may be performed by processing logic that may include hardware (circuitry, dedicated logic, etc.), software (such as is run on a computer system or a dedicated machine), or a combination of both, which processing logic may be included in the processing device 1902 of FIG. 19, the communication system 1800 of FIG. 18, or another device, combination of devices, or systems.

The method 1700 may begin at block 1705 where the processing logic may decode, at the ONU, the first downstream signal.

At block 1710, the processing logic may decode, at the ONU, the second downstream signal by canceling the first downstream signal from the combined downstream signal.

Modifications, additions, or omissions may be made to the method 1700 without departing from the scope of the present disclosure. For example, in some embodiments, the method 1700 may include any number of other components that may not be explicitly illustrated or described.

In some embodiments, a transmitter for NOMA downstream transmission may comprise: a non-orthogonal multiplexing transmitter for PON downstream transmission in which: (i) a first PON signal may be generated according to a PON protocol; and (ii) a second PON transmission with a different (e.g., lower) transmit signal level may be generated and combined with the first PON signal. In some examples, the second signal may use one or more of: (a) a different protocol than the first signal, (b) a different modulation than the first signal, (c) a different error correction code than the first signal, (d) a different protocol than the first signal, (e) a different burst setting (e.g., the second signal may be transmitted in bursts, while the first signal may be continuous).

In some embodiments, a receiver for NOMA downstream transmission may comprise a first PON signal that may be received according to a PON protocol. The first PON signal may be demodulated and decoded by a hard decision and canceled from the receive signal with a signal cancellation filter. Alternatively, or in addition, the first PON signal may be demodulated, decoded, re-encoded, re-modulated, and canceled from the receive signal with a signal cancellation filter.

In some embodiments, the signals for nominal-rate channel cancellation may be taken from: (i) the ADC output (nominal-rate channel equalizer input) and the nominal-rate channel FEC decoder output (using re-encoding of the signal and filtering) in which the high-capacity channel may have a separate equalizer; (ii) the ADC output (nominal-rate channel equalizer input) and the nominal-rate channel hard decision (slicer) output for low latency (using filtering) in which the high-capacity channel may have a separate equalizer; (iii) the nominal-rate channel equalizer output and the nominal-rate channel FEC decoder output (using re-encoding of the signal and filtering) in which the high-capacity channel does not comprise a separate equalizer; (iv) the nominal-rate equalizer output and the nominal-rate channel hard decision (slicer) output for low latency (using filtering) in which the high-capacity channel may have a separate equalizer; (v) the nominal-rate equalizer output and the nominal-rate channel FEC decoder output (using re-encoding of the signal and filtering) in which the high-capacity channel does not comprise a separate equalizer; (vi) the nominal-rate equalizer output and the nominal-rate channel hard decision (slicer) output for low latency (using filtering) in which the high-capacity channel does not comprise a separate equalizer.

In some embodiments, a second PON transmission (e.g., the high-capacity channel) may be received. The high-capacity channel may use a different protocol than the nominal-rate channel. The high-capacity channel may use a different modulation than the nominal-rate channel. The high-capacity channel may use a different error correction code than the nominal-rate channel. The high-capacity channel may use a different protocol than the nominal-rate channel. The high-capacity channel may be transmitted in bursts, while the nominal-rate channel may be continuous.

In some embodiments, to establish the high-capacity channel, the OLT transmitter may request channel quality information from the ONU receivers, e.g., via the nominal-rate channel. From the channel quality information and the requested data rates, modulation, FEC, and rate settings may be computed. The burst information may be provided to the ONU receivers and the bursts on the high-capacity channel may be transmitted.

In some embodiments, one or more of the latency may be reduced, the robustness may be increased, or the coverage may be increased. To reduce latency in the downstream direction, the high-capacity channel may be present during times when the nominal-rate channel may be occupied, e.g., for transmission of the control channel. To increase robustness and coverage, the high-capacity channel may be used to transmit additional FEC parity bits for the nominal-rate channel.

In some embodiments, a system for NOMA upstream transmission may comprise: a non-orthogonal multiplexing receiver for PON upstream transmission in which a first PON signal may be received from a first ONU transmitter, and a second PON signal may be received from second ONU transmitter. In one example, the signals from different ONUs may be transmitted such that the receive power at the OLT may be different and the signals may be separated by the different power levels. In one embodiment, ONUs may be selected with different channel attenuation for simultaneous reception. In another embodiment, different transmit powers may be selected for ONUs to be received at the same time.

In another embodiment, a combination of different channel attenuation and transmit power for ONUs to be received simultaneously may be used.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 18 illustrates a block diagram of an example communication system 1800 configured for wireless communication, in accordance with at least one embodiment described in the present disclosure. The communication system 1800 may include a digital transmitter 1802, a radio frequency circuit 1804, a device 1814, a digital receiver 1806, and a processing device 1808. The digital transmitter 1802 and the processing device may be configured to receive a baseband signal via connection 1810. A transceiver 1816 may comprise the digital transmitter 1802 and the radio frequency circuit 1804.

In some embodiments, the communication system 1800 may include a system of devices that may be configured to communicate with one another via a wired or wireline connection. For example, a wired connection in the communication system 1800 may include one or more Ethernet cables, one or more fiber-optic cables, and/or other similar wired communication mediums. Alternatively, or additionally, the communication system 1800 may include a system of devices that may be configured to communicate via one or more wireless connections. For example, the communication system 1800 may include one or more devices configured to transmit and/or receive radio waves, microwaves, ultrasonic waves, optical waves, electromagnetic induction, and/or similar wireless communications. Alternatively, or additionally, the communication system 1800 may include combinations of wireless and/or wired connections. In these and other embodiments, the communication system 1800 may include one or more devices that may be configured to obtain a baseband signal, perform one or more operations to the baseband signal to generate a modified baseband signal, and transmit the modified baseband signal, such as to one or more loads.

In some embodiments, the communication system 1800 may include one or more communication channels that may communicatively couple systems and/or devices included in the communication system 1800. For example, the transceiver 1816 may be communicatively coupled to the device 1814.

In some embodiments, the transceiver 1816 may be configured to obtain a baseband signal. For example, as described herein, the transceiver 1816 may be configured to generate a baseband signal and/or receive a baseband signal from another device. In some embodiments, the transceiver 1816 may be configured to transmit the baseband signal. For example, upon obtaining the baseband signal, the transceiver 1816 may be configured to transmit the baseband signal to a separate device, such as the device 1814. Alternatively, or additionally, the transceiver 1816 may be configured to modify, condition, and/or transform the baseband signal in advance of transmitting the baseband signal. For example, the transceiver 1816 may include a quadrature up-converter and/or a digital to analog converter (DAC) that may be configured to modify the baseband signal. Alternatively, or additionally, the transceiver 1816 may include a direct radio frequency (RF) sampling converter that may be configured to modify the baseband signal.

In some embodiments, the digital transmitter 1802 may be configured to obtain a baseband signal via connection 1810. In some embodiments, the digital transmitter 1802 may be configured to up-convert the baseband signal. For example, the digital transmitter 1802 may include a quadrature up-converter to apply to the baseband signal. In some embodiments, the digital transmitter 1802 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 1802.

In some embodiments, the transceiver 1816 may include one or more subcomponents that may be used in preparing the baseband signal and/or transmitting the baseband signal. For example, the transceiver 1816 may include an RF front end (e.g., in a wireless environment) which may include a power amplifier (PA), a digital transmitter (e.g., 1802), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some embodiments, a radio (e.g., a radio frequency circuit 1804) of the transceiver 1816 may be synchronized with the resource controller via the S-plane device, which may contribute to high-accuracy timing with respect to a reference clock.

In some embodiments, the transceiver 1816 may be configured to obtain the baseband signal for transmission. For example, the transceiver 1816 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1816 may be configured to generate a baseband signal for transmission. In these and other embodiments, the transceiver 1816 may be configured to transmit the baseband signal to another device, such as the device 1814.

In some embodiments, the device 1814 may be configured to receive a transmission from the transceiver 1816. For example, the transceiver 1816 may be configured to transmit a baseband signal to the device 1814.

In some embodiments, the radio frequency circuit 1804 may be configured to transmit the digital signal received from the digital transmitter 1802. In some embodiments, the radio frequency circuit 1804 may be configured to transmit the digital signal to the device 1814 and/or the digital receiver 1806. In some embodiments, the digital receiver 1806 may be configured to receive a digital signal from the RF circuit and/or send a digital signal to the processing device 1808.

In some embodiments, the processing device 1808 may be a standalone device or system, as illustrated. Alternatively, or additionally, the processing device 1808 may be a component of another device and/or system. For example, in some embodiments, the processing device 1808 may be included in the transceiver 1816. In instances in which the processing device 1808 is a standalone device or system, the processing device 1808 may be configured to communicate with additional devices and/or systems remote from the processing device 1808, such as the transceiver 1816 and/or the device 1814. For example, the processing device 1808 may be configured to send and/or receive transmissions from the transceiver 1816 and/or the device 1814. In some embodiments, the processing device 1808 may be combined with other elements of the communication system 1800.

FIG. 19 illustrates a diagrammatic representation of a machine in the example form of a computing device 1900 within which a set of instructions, for causing the machine to perform any one or more of the methods discussed herein, may be executed. The computing device 1900 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1900 includes a processing device (e.g., a processor) 1902, a main memory 1904 (e.g., read-only memory (ROM), flash memory, dynamic random access memory (DRAM) such as synchronous DRAM (SDRAM)), a static memory 1906 (e.g., flash memory, static random access memory (SRAM)) and a data storage device 1916, which communicate with each other via a bus 1908.

Processing device 1902 represents one or more general-purpose processing devices such as a microprocessor, central processing unit, or the like. More particularly, the processing device 1902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1902 may also include one or more special-purpose processing devices such as an application specific integrated circuit (ASIC), a field programmable gate array (FPGA), a digital signal processor (DSP), network processor, or the like. The processing device 1902 is configured to execute instructions 1926 for performing the operations and steps discussed herein.

The computing device 1900 may further include a network interface device 1922 which may communicate with a network 1918. The computing device 1900 also may include a display device 1910 (e.g., a liquid crystal display (LCD) or a cathode ray tube (CRT)), an alphanumeric input device 1912 (e.g., a keyboard), a cursor control device 1914 (e.g., a mouse) and a signal generation device 1920 (e.g., a speaker). In at least one embodiment, the display device

1910, the alphanumeric input device 1912, and the cursor control device 1914 may be combined into a single component or device (e.g., an LCD touch screen).

The data storage device 1916 may include a computer-readable storage medium 1924 on which is stored one or more sets of instructions 1926 embodying any one or more of the methods or functions described herein. The instructions 1926 may also reside, completely or at least partially, within the main memory 1904 and/or within the processing device 1902 during execution thereof by the computing device 1900, the main memory 1904 and the processing device 1902 also constituting computer-readable media. The instructions may further be transmitted or received over a network 1918 via the network interface device 1922.

While the computer-readable storage medium 1924 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples of the performance characteristics according to embodiments of the present disclosure.

Example 1: Network Topology for Simulation

Figure 20:
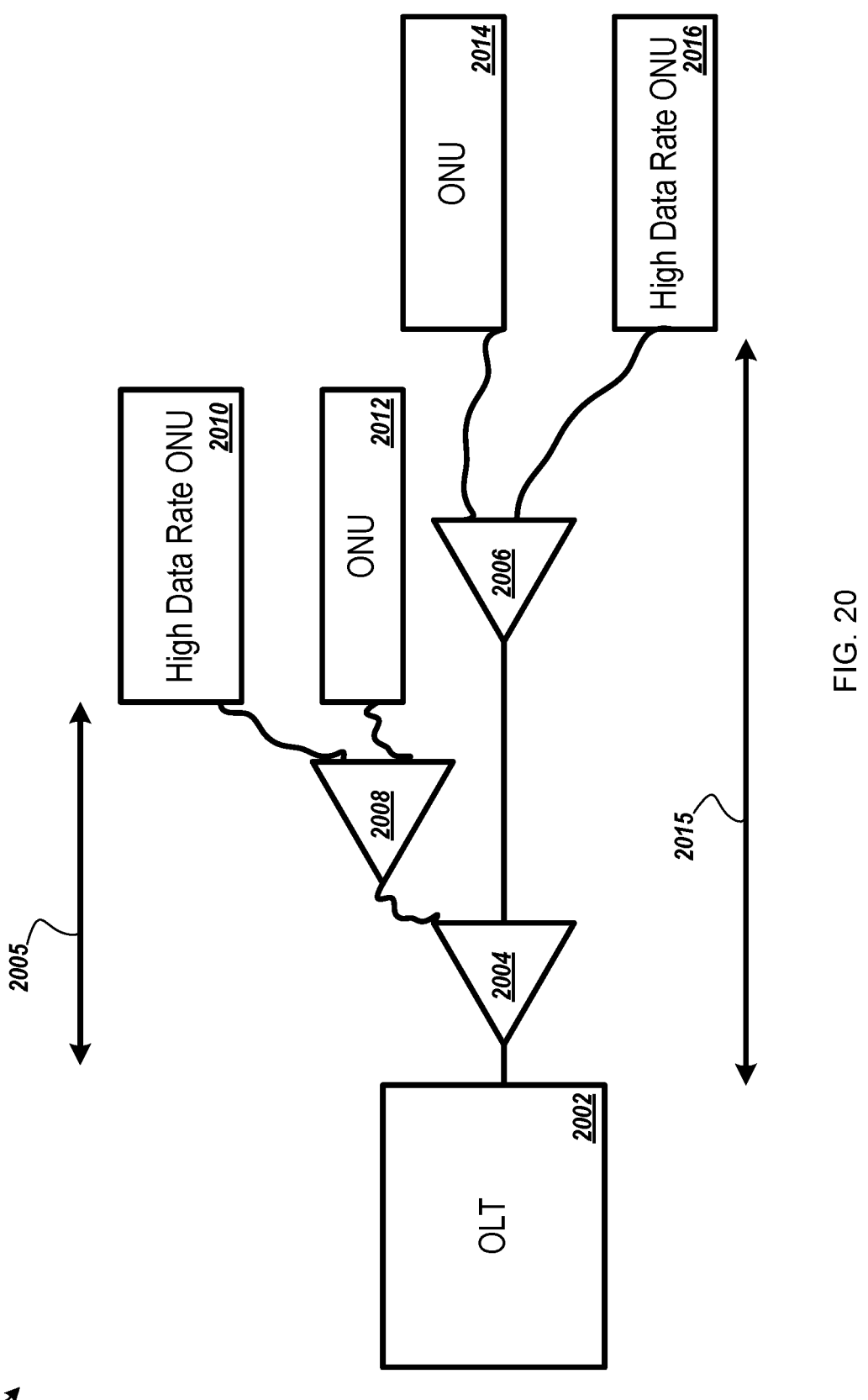
FIG. 20 illustrates an example network topology for simulation.

The performance characteristics for a PON comprising a nominal-rate channel and a high-capacity channel are presented in some examples. The network topology 2000 of FIG. 20 is provided for: (i) ONUs connected through a short fiber branch of 10 km length 2005 (e.g., high-data rate ONU 2010 and ONU 2012) to an OLT 2002 and (ii) ONUs connected through a longer fiber of 20 km length 2015 (e.g., ONU 2014 and high-date rate ONU 2016) to the OLT 2002. The end-to-end attenuation of the ONUs may differ, e.g., due to different splitter (2004, 2008, 2006) and connector losses.

In some examples, the nominal-rate channel was 50 Gbit/s PON using NRZ modulation, and the high-capacity channel used 25 Gbit/s or 50 Gbit/s with NRZ modulation. In some examples, ONUs with a higher quality channel may be served using PAM-4 transmission and ONUs with a lower quality channel (or without PAM-4 support) may be served using NRZ transmission.

Example 2: BER vs. RX Power for NPZ and PAM-4 Transmission at 10 km and 20 km

Figure 21:
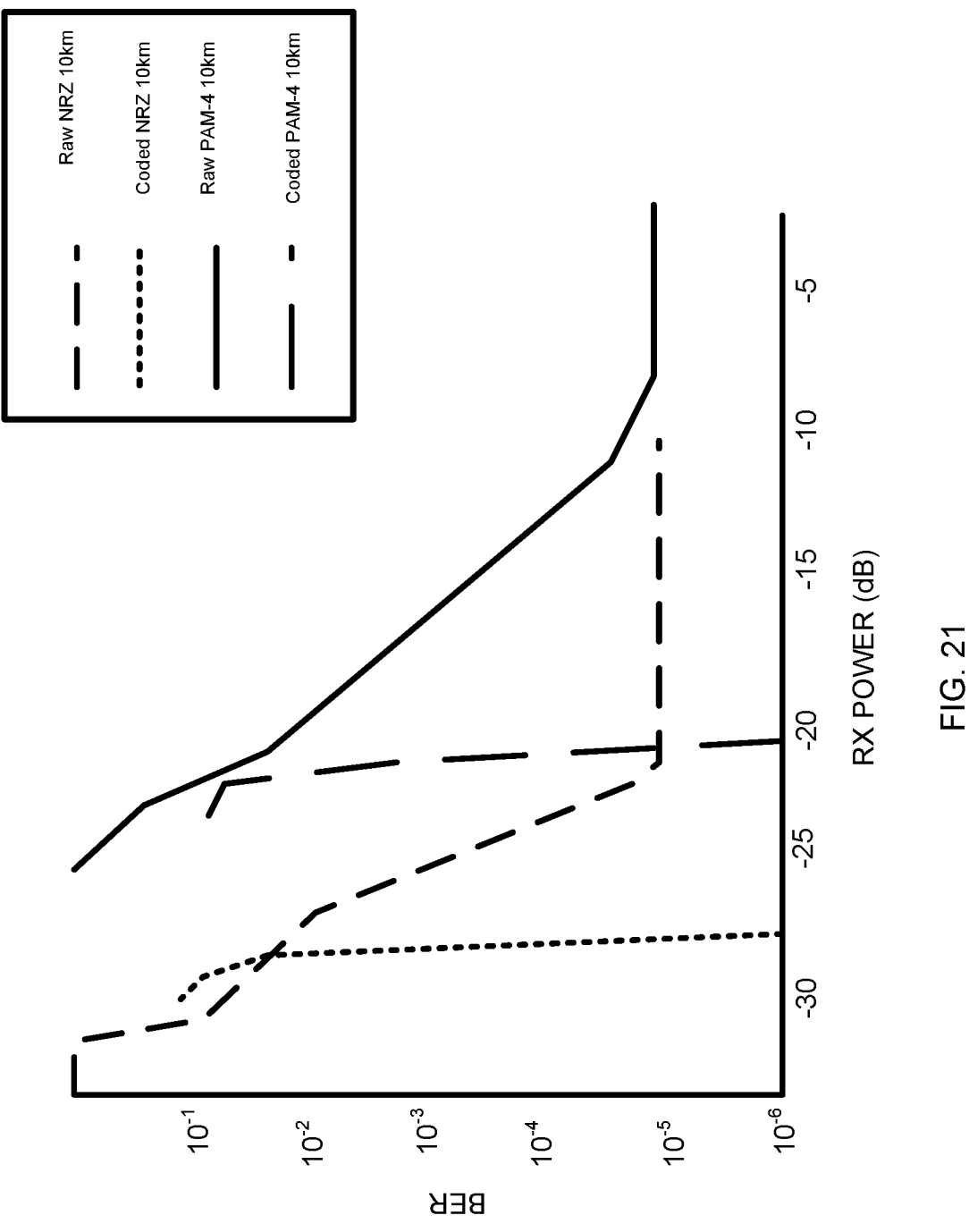
FIG. 21 illustrates bit error ratio (BER) vs. optical receive power for PAM-4 and NRZ transmission at 10 km fiber length.
Figure 22:
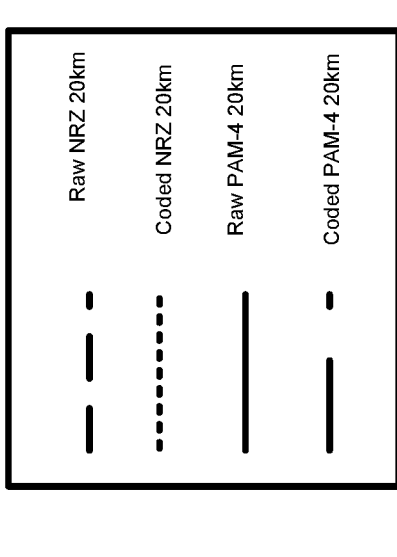
FIG. 22 illustrates bit error ratio (BER) vs. optical receive power for PAM-4 and NRZ transmission at 20 km fiber length.

As illustrated in FIGS. 21 and 22, the received optical power vs. BER (raw BER and post-FEC BER) was provided for transmission using NRZ and PAM-4 for a fiber length of 10 km and 20 km. The 50G PON LDPC code with a code rate of 0.844 was used for the simulation.

As illustrated in FIG. 21, the raw NRZ and coded NRZ signals transmitted over a fiber length of 10 km had a BER that was below $10^{-5}$ for an RX power of greater than about −22 dB and below about $10^{-6}$ for an RX power of greater than about −27 dB, respectively. Similarly, as illustrated in FIG. 22, the raw NRZ and coded NRZ signals transmitted over a fiber length of 20 km had a BER that was below $10^{-5}$ for an RX power of greater than about −18 dB and below about $10^{-6}$ for an RX power of greater than about −26 dB, respectively. Therefore, with increased dispersion present in the 20 km fiber, the NRZ transmission was stable for both the 10 km fiber length and the 20 km fiber length.

In contrast, the raw PAM-4 and coded PAM-4 signals transmissions were stable for the 10 km fiber length but not for the 20 km fiber length. As illustrated in FIG. 21, the raw PAM-4 and coded PAM-4 signals transmitted over a fiber length of 10 km had a BER that was below $10^{-5}$ for an RX power of greater than about −10 dB and below about $10^{-6}$ for an RX power of greater than about −21 dB, respectively. As illustrated in FIG. 22, the raw PAM-4 and coded PAM-4 signals transmitted over a fiber length of 20 km had a BER that was above about $10^{-1}$ for an RX power of greater than about −5 dB and above about $10^{-1}$ for an RX power of greater than about −5 dB, respectively. Therefore, with increased dispersion of the 20 km fiber, the PAM-4 transmissions were not be stable, while the NRZ transmissions were stable for both 10 km and 20 km fibers.

Figure 23:
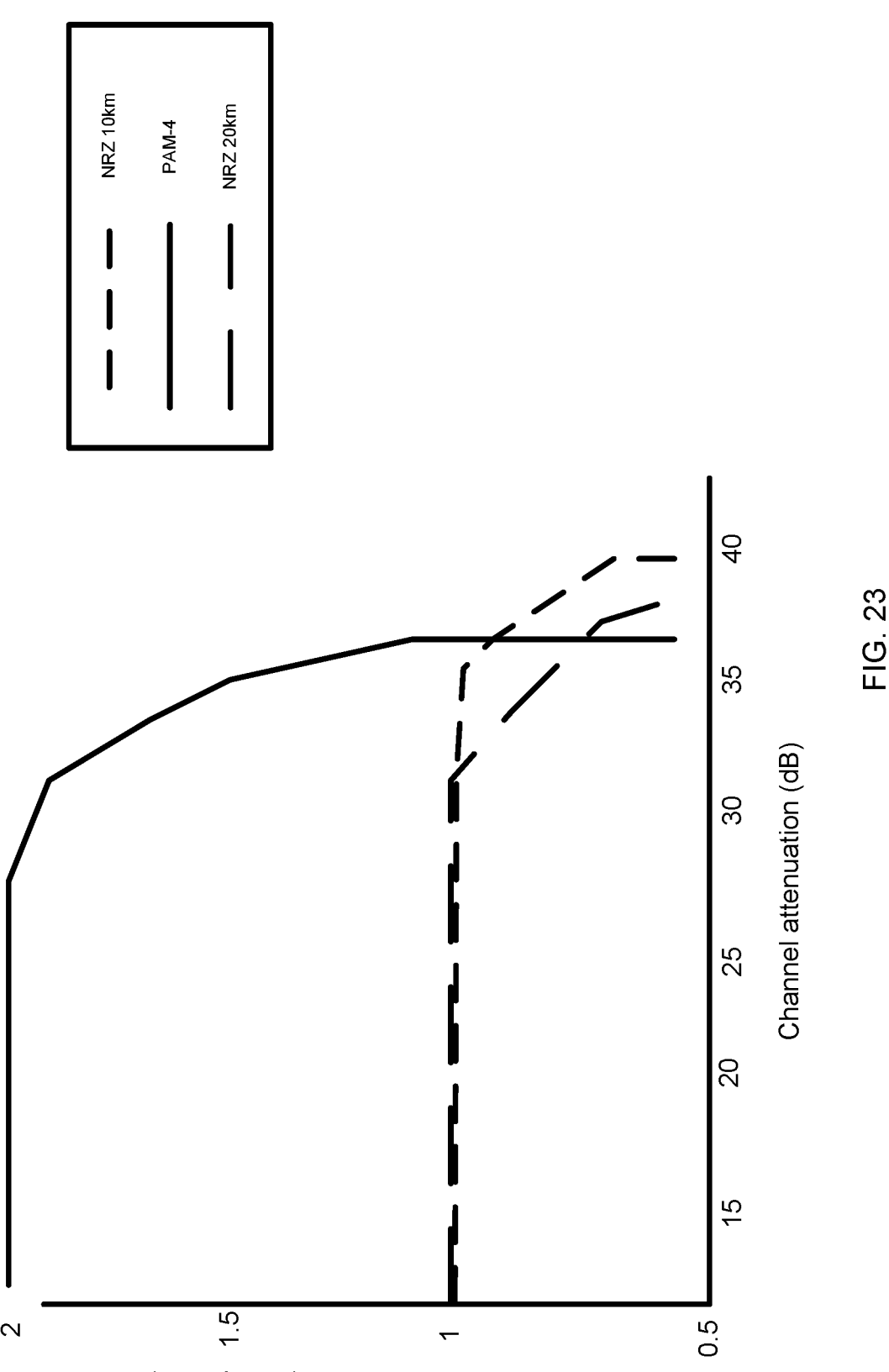
FIG. 23 illustrates mutual information vs. channel attenuation for NRZ and PAM-4 transmission.

Example 3: Mutual Information vs. Channel Attenuation for NRZ and PAM-4 Transmission As illustrated in FIG. 23, the channel mutual information (bits/symbol) vs. channel attenuation (dB) was provided when using 7 dBm transmit power for NRZ transmission (10 km fiber length and 20 km fiber length) and 10 dBm transmit power for PAM-4 transmission.

For an NRZ transmission over a 10 km fiber length, the mutual information in bits per symbol was about 1 for a channel attenuation of from about 15 dB to about 32 dB. As the channel attenuation increased past about 32 dB to about 40 dB, the mutual information in bits per symbol decreased from about 1 to about 0.5.

Similarly, for an NRZ transmission over a 20 km fiber length, the mutual information in bits per symbol was about 1 for a channel attenuation of from about 15 dB to about 32 dB. As the channel attenuation increased past about 32 dB to about 37 dB, the mutual information in bits per symbol decreased from about 1 to about 0.5.

Consequently, the maximum channel attenuation of PON networks for 50G-PON may be 29 dB or 32 dB, for example, and a maximum fiber length may be 20 km when NRZ transmission is used. Thus, NRZ-based transmission with 50 Gbit/s with 7 dBm transmit power was reliable for the maximum fiber length and attenuation budget.

For a PAM-4 transmission over a 10 km fiber length, the mutual information in bits per symbol was about 2 for a channel attenuation of from about 15 dB to about 27 dB. As the channel attenuation increased past about 27 dB to about 35 dB, the mutual information in bits per symbol decreased from about 2 to about 0.5. Therefore, stable PAM-4 transmission was possible at shorter fiber length for slightly lower maximum attenuation.

Example 4: Mutual Information vs. Channel Attenuation for NOMA Transmission

As illustrated in FIG. 24, NRZ transmission for a fiber length of 10 km and 20 km and PAM-4 transmission for a fiber length of 10 km, as provided in the previous Example, was compared to NOMA transmission using mutual information (in bits per symbol) vs. channel attenuation (in dB).

For NOMA transmission, the high-capacity channel was added to the NRZ channel where the modulation amplitude of the high-capacity channel can be varied. Hereby, a scaling parameter $\alpha$ was introduced, where $\alpha=0$ provided no NOMA channel, while $\alpha=1$ provided 4 equidistant levels used for PAM-4 transmission. To increase the reach of the NOMA channel, the NOMA channel was transmitted with 50 Gbit/s or with 25 Gbit/s line rate by repetition of each bit. The transmit power was 10 dBm for NOMA transmission and PAM-4 transmission. Mutual information vs. channel attenuation was simulated.

For a NOMA transmission over a 10 km fiber length using an alpha of 0.4 and a 50G bit/s line, the mutual information in bits per symbol was: about 1.9 for a channel attenuation of about 13 dB; about 1.8 for a channel attenuation of about 22; about 1.6 for a channel attenuation of about 27; about 1.4 for a channel attenuation of about 31; and about 1.2 for a channel attenuation of about 34.

For a NOMA transmission over a 20 km fiber length using an alpha of 0.4 and a 50G bit/s line, the mutual information in bits per symbol was: about 1.6 for a channel attenuation of about 18 dB; about 1.4 for a channel attenuation of about 28; about 1.2 for a channel attenuation of about 23; and about 1.0 for a channel attenuation of about 35.

For a NOMA transmission over a 10 km fiber length using an alpha of 0.4 and a 25G bit/s line, the mutual information in bits per symbol was: about 1.5 for a channel attenuation of from about 13 dB to about 25 dB; about 1.4 for a channel attenuation of about 30; and about 1.2 for a channel attenuation of about 34.

For a NOMA transmission over a 20 km fiber length using an alpha of 0.4 and a 25G bit/s line, the mutual information in bits per symbol was: about 1.5 for a channel attenuation of from about 13 dB to about 25 dB; about 1.4 for a channel attenuation of about 27; and about 1.2 for a channel attenuation of about 33.

Therefore, while PAM-4 transmission was not stable at 20 km fiber length, the high-capacity channel of NOMA transmission was stable using both 10 km and 20 km fiber. While the capacity of NOMA transmission was lower than the PAM-4 capacity, the PAM-4 and NRZ transmission were separated in time, while the NOMA nominal-rate channel and high-capacity channel were provided at the same time.

Example 5: Channel Attenuation vs. Data Rate for NOMA Transmission Compared to Time-Interleaved PAM-4 and NRZ Transmission As illustrated in FIG. 25, the sum rate of time-interleaved NRZ and PAM-4 transmission was lower than NOMA transmission for two NRZ data streams. The lines were assumed such that: (i) 25% of the lines were 10 km; (ii) 25% of the lines were 20 km, (iii) 25% of the lines supported PAM-4/NOMA with 10 km length; and (iv) 25% of the lines supported PAM-4/NOMA with 20 km length.

For an NRZ transmission over a 10 km fiber length, the data rate in Gigabits per second (Gbits/s) was about 42 for a channel attenuation of from about 18 dB to about 34 dB. For an NRZ transmission over a 20 km fiber length, the data rate in Gbits/s was: about 42 for a channel attenuation of from about 18 dB to about 32 dB; and about 0 for a channel attenuation of about 32 or greater. For a PAM-4 transmission over a 10 km fiber length, the data rate in Gbits/s was: about 83 for a channel attenuation of from about 12 dB to about 31 dB; and about 0 dB for a channel attenuation of about 32 or greater.

For time-interleaved NRZ and PAM-4 signals, the rate in Gbits/s did not fall as quickly as the channel attenuation increased past a specific threshold. For an NRZ transmission over a 10 km fiber length, the data rate in Gbits/s was about 50 for a channel attenuation of from about 18 dB to about 34 dB. For an NRZ transmission over a 20 km fiber length, the data rate in Gbits/s was: about 50 for a channel attenuation of from about 18 dB to about 32 dB; and about 40 for a channel attenuation of about 34 dB. For a PAM-4 transmission over a 10 km fiber length, the data rate in Gbits/s was: about 100 for a channel attenuation of from about 12 dB to about 28 dB; about 90 for a channel attenuation of about 31 dB; about 80 for a channel attenuation of about 33 dB; and about 70 for a channel attenuation of about 34.

For a combined NRZ and PAM-4 transmission, the data rate in Gbits/s was about 52 for a channel attenuation of from about 12 dB to about 31 dB.

For a combined nominal-rate channel plus NOMA transmission, the data rate in Gbits/s was: about 70 for a channel attenuation of from about 12 dB to about 20 dB; about 65 for a channel attenuation of from about 21 dB to about 25 dB; about 62 for a channel attenuation of from about 25 dB to about 27 dB; about 50 for a channel attenuation of about 30; and about 20 for a channel attenuation of from about 32 to about 34.

Therefore, for NOMA transmission of the high-capacity channel and the nominal-rate channel, the data rate of the high-capacity channel was added to the rate of the nominal-rate channel which facilitated a doubling in the data rate for sufficiently low channel attenuation.

Figure 26:
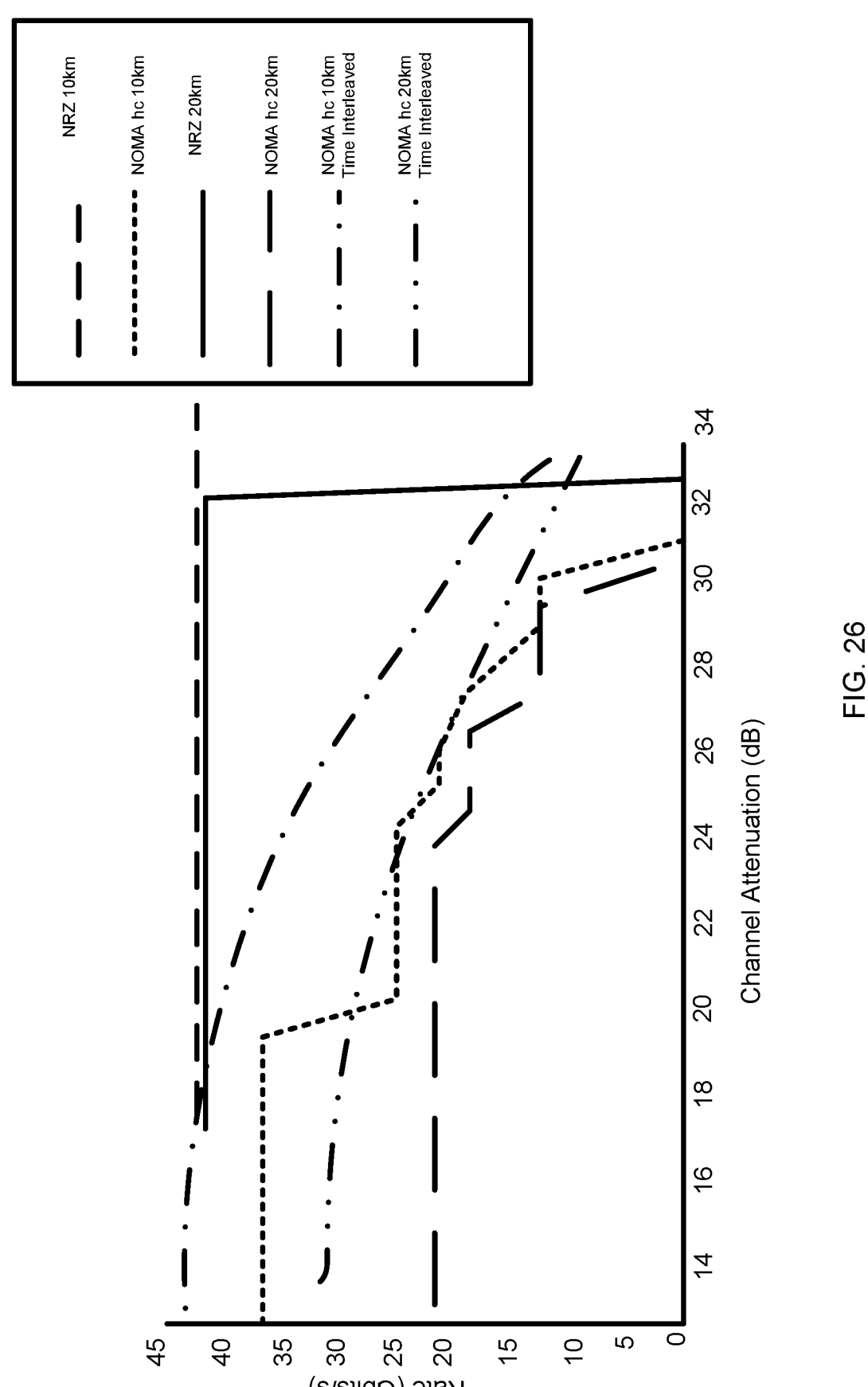
FIG. 26 illustrates attenuation vs. data rate for different rate and FEC settings.

Example 6: Channel Attenuation Vs. Data Rate for Different Rate and FEC Settings As illustrated in FIG. 26, for the high-capacity channel, the modulation, symbol rate, and FEC code rate were adapted with respect to the channel quality. Three different low density parity check (LDPC) code rates (0.844, 0.75, 0.5) and two symbol rates (50 Gbit/s, 25 Gbit/s) were used.

For an NRZ transmission over a 10 km fiber length, the data rate in Gigabits per second (Gbits/s) was about 42 for a channel attenuation of from about 18 dB to about 34 dB. For an NRZ transmission over a 20 km fiber length, the data rate in Gbits/s was: about 42 for a channel attenuation of from about 18 dB to about 32 dB; and about 0 for a channel attenuation of about 32 or greater.

For a NOMA transmission using a high-capacity channel over a 10 km fiber length, the data rate in Gbits/s was: about 37 for a channel attenuation of from about 12 dB to about 20 dB (using an LDPC code rate of 0.5 and a symbol rate of 50G); about 25 for a channel attenuation of from about 21 dB to about 25 dB (using an LDPC code rate of 0.5 and a symbol rate of 50G); about 21 for a channel attenuation of from about 25 dB to about 27 dB (using an LDPC code rate of 0.844 and a symbol rate of 25G); about 19 for a channel attenuation of from about 27 dB to about 29 dB (using an LDPC code rate of 0.75 and a symbol rate of 25G); and about 13 for a channel attenuation of from about 29 to about 31 (using an LDPC code rate of 0.5 and a symbol rate of 25G); and about 0 for a channel attenuation of greater than about 32 dB.

For a NOMA transmission using a high-capacity channel over a 20 km fiber length, the data rate in Gbits/s was: about 21 for a channel attenuation of from about 12 dB to about 24 dB (using an LDPC code rate of 0.844 and a symbol rate of 25G); about 19 for a channel attenuation of from about 25 dB to about 27 dB (using an LDPC code rate of 0.75 and a symbol rate of 25G); about 13 for a channel attenuation of from about 28 dB to about 30 dB (using an LDPC code rate of 0.5 and a symbol rate of 25G); and about 0 for a channel attenuation of greater than about 32 dB. Therefore, different rate and FEC settings provided different data rates for particular channel attenuation values.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An optical line terminal (OLT) for downstream transmission in a passive optical network (PON), comprising:
   a processing device configured to:
      generate a first downstream signal for transmission on a first channel at a first signal level; and
      generate a second downstream signal for transmission on a second channel at a second signal level, wherein the first signal level is greater than the second signal level; and
   a physical medium dependent (PMD) transmitter configured to transmit a combined downstream signal comprising the first downstream signal and the second downstream signal,
   wherein a first transmit power of the first downstream signal is selected based on a comparison to a second transmit power of the second downstream signal to facilitate reception of the first downstream signal from the combined downstream signal at an optical network unit (ONU),
   wherein the processing device is further configured to compute, at the OLT, a transmit power increase and an extinction ratio increase when the combined downstream signal is transmitted.

2. The OLT of claim 1, wherein the second channel has a greater data capacity than the first channel.

3. The OLT of claim 1, wherein the processing device is further configured to:
   compute a transmit power scale factor for the second downstream signal, wherein the transmit power scale factor is selected to facilitate reception of the first downstream signal from the combined downstream signal.

4. The OLT of claim 1, wherein the processing device is further configured to:
   combine the second downstream signal with the first downstream signal using non-orthogonal multiple access (NOMA).

5. The OLT of claim 1, wherein the processing device is further configured to:
   compute transmission parameter values for the first downstream signal that are different from transmission parameter values for the second downstream signal, wherein the transmission parameters include one or more of: a modulation setting, a forward error correction (FEC) setting, a symbol rate, a frame structure, a communication protocol, or a burst setting.

6. The OLT of claim 1, wherein the processing device is further configured to:
   use non-linear equalization and non-linear pre-compensation to increase a signal quality for the second downstream signal compared to the signal quality for the first downstream signal.

7. The OLT of claim 1, wherein the processing device is further configured to:
   compute a first offset compensation for the second downstream signal when a first bit value from the first channel is identified; and
   compute a second offset compensation for the second downstream signal when a second bit value from the first downstream signal is identified, wherein the first bit value is different from the second bit value.

8. The OLT of claim 1, wherein the processing device is further configured to:
   transmit duplicate data on the second channel to increase forward error correction (FEC) protection, or
   transmit data on the second channel to reduce latency, or
   transmit data on the second channel to reduce power usage.

9. A method, comprising:
   generating a first downstream signal for transmission on a first channel at a first signal level;
   generating a second downstream signal for transmission on a second channel at a second signal level, wherein the first signal level is greater than the second signal level;
   transmitting a combined downstream signal comprising the first downstream signal and the second downstream signal, wherein a first transmit power of the first downstream signal is selected based on a comparison to a second transmit power of the second downstream signal to facilitate reception of the first downstream signal from the combined downstream signal at an optical network unit (ONU); and
   computing a transmit power increase and an extinction ratio increase when the combined downstream signal is transmitted.

10. The method claim 9, wherein the second channel has a greater data capacity than the first channel.

11. The method claim 9, further comprising computing a transmit power scale factor for the second downstream signal, wherein the transmit power scale factor is selected to facilitate reception of the first downstream signal from the combined downstream signal.

12. The method claim 9, further comprising combining the second downstream signal with the first downstream signal using non-orthogonal multiple access (NOMA).

13. The method claim 9, further comprising computing transmission parameter values for the first downstream signal that are different from transmission parameter values for the second downstream signal, wherein the transmission parameters include one or more of: a modulation setting, a forward error correction (FEC) setting, a symbol rate, a frame structure, a communication protocol, or a burst setting.

14. The method claim 9, further comprising using non-linear equalization and non-linear pre-compensation to increase a signal quality for the second downstream signal compared to the signal quality for the first downstream signal.

15. The method claim 9, further comprising:
   computing a first offset compensation for the second downstream signal when a first bit value from the first channel is identified; and computing a second offset compensation for the second downstream signal when a second bit value from the first downstream signal is identified, wherein the first bit value is different from the second bit value.

16. The method claim 9, further comprising:

transmitting duplicate data on the second channel to increase forward error correction (FEC) protection, or transmitting data on the second channel to reduce latency, or transmitting data on the second channel to reduce power usage.

* * * * *